(12) United States Patent
Connors et al.

(10) Patent No.: US 8,130,664 B2
(45) Date of Patent: Mar. 6, 2012

(54) MACRO-DIVERSITY REGION RATE MODIFICATION

(75) Inventors: Dennis P. Connors, San Diego, CA (US); Huei-Jiun Ju, San Diego, CA (US); Sina Zahedi, San Diego, CA (US); Neeraj Poojary, San Diego, CA (US)

(73) Assignee: Wi-LAN, Inc., Ottawa (CA)

( * ) Notice: Subject to any disclaimer, the term of this patent is extended or adjusted under 35 U.S.C. 154(b) by 855 days.

(21) Appl. No.: 12/104,567

(22) Filed: Apr. 17, 2008

(65) Prior Publication Data

US 2008/0259849 A1 Oct. 23, 2008

Related U.S. Application Data

(60) Provisional application No. 60/912,661, filed on Apr. 18, 2007, provisional application No. 60/953,452, filed on Aug. 1, 2007, provisional application No. 60/971,837, filed on Sep. 12, 2007.

(51) Int. Cl.
*H04J 1/16* (2006.01)
*H04J 3/16* (2006.01)
*H04L 12/28* (2006.01)

(52) U.S. Cl. ............... 370/252; 370/412; 370/465

(58) Field of Classification Search .............. None
See application file for complete search history.

(56) References Cited

U.S. PATENT DOCUMENTS

| | | | |
|---|---|---|---|
| 5,452,288 A | 9/1995 | Rahuel et al. | |
| 5,544,198 A | 8/1996 | Saalfrank et al. | |
| 5,659,685 A | 8/1997 | Williams et al. | |
| 5,740,534 A | 4/1998 | Ayerst et al. | |
| 5,867,791 A | 2/1999 | Chambert | |
| 5,892,910 A | 4/1999 | Safadi | |
| 6,009,325 A | 12/1999 | Retzer et al. | |
| 6,112,100 A | 8/2000 | Ossoinig et al. | |
| 6,172,988 B1 | 1/2001 | Tiernan et al. | |

(Continued)

FOREIGN PATENT DOCUMENTS

EP 1 237 371 9/2002

(Continued)

OTHER PUBLICATIONS

Digital Video Broadcasting (DVB); Transmission System for Handheld Terminals (DVB-H), ETSI EN 302 304 V1.1.1 (Nov. 2004).

(Continued)

*Primary Examiner* — Andrew Lee
(74) *Attorney, Agent, or Firm* — Volpe and Koenig, P.C.

(57) ABSTRACT

A system including a buffer to receive and store a stream of content data. A controller module may be configured to determine the macro-diversity region size based on a set of pre-selected configuration parameters including an incoming rate of the content data and to allocate at least a portion of the content data to a macro-diversity region, to monitor an amount of the content data in the buffer in accordance with the set of pre-selected configuration parameters including an incoming rate of the content data to determine whether the amount of content data falls into or out of a target range defined by a low-end value and a high-end value and to adjust the size of the macro-diversity region by one or more increments in response to changes in the amount of the content data in accordance with the target range.

28 Claims, 14 Drawing Sheets

U.S. PATENT DOCUMENTS

| | | | |
|---|---|---|---|
| 6,192,038 B1 | 2/2001 | Wallerius et al. | |
| 6,212,190 B1 | 4/2001 | Mulligan et al. | |
| 6,502,131 B1 | 12/2002 | Vaid et al. | |
| 6,628,638 B1 | 9/2003 | Sato et al. | |
| 6,721,797 B1* | 4/2004 | Kim | 709/232 |
| 6,847,826 B1 | 1/2005 | Wesby et al. | |
| 6,898,640 B1 | 5/2005 | Kurita et al. | |
| 7,035,215 B1* | 4/2006 | Engdahl | 370/235 |
| 7,058,407 B2 | 6/2006 | Chi et al. | |
| 7,099,348 B1 | 8/2006 | Warwick et al. | |
| 7,107,061 B1* | 9/2006 | Tontiruttananon et al. | 455/453 |
| 7,242,960 B2 | 7/2007 | Van Rooyen | |
| 7,283,817 B2 | 10/2007 | Salo et al. | |
| 7,301,905 B1* | 11/2007 | Tontiruttananon et al. | 370/232 |
| 7,324,832 B2 | 1/2008 | Van Rooyen | |
| 7,333,829 B2 | 2/2008 | Malone et al. | |
| 7,362,735 B2 | 4/2008 | Mantha | |
| 7,421,244 B2 | 9/2008 | Van Rooyen | |
| 7,450,899 B2 | 11/2008 | Roberts et al. | |
| 7,522,536 B2* | 4/2009 | Roberts et al. | 370/252 |
| 7,593,738 B2 | 9/2009 | Anderson | |
| 7,599,327 B2 | 10/2009 | Zhuang | |
| 7,613,104 B2 | 11/2009 | Bhatt et al. | |
| 7,768,966 B2 | 8/2010 | Yoon et al. | |
| 2001/0030956 A1 | 10/2001 | Chillariga et al. | |
| 2001/0046240 A1 | 11/2001 | Longoni et al. | |
| 2002/0061012 A1 | 5/2002 | Thi et al. | |
| 2002/0086691 A1 | 7/2002 | Kostic et al. | |
| 2002/0138560 A1 | 9/2002 | Aaltonen et al. | |
| 2002/0160784 A1* | 10/2002 | Kuwahara et al. | 455/452 |
| 2003/0002474 A1 | 1/2003 | Alexander et al. | |
| 2003/0072255 A1 | 4/2003 | Ma et al. | |
| 2003/0095513 A1 | 5/2003 | Woodmansee et al. | |
| 2004/0017777 A1 | 1/2004 | Chaudhuri et al. | |
| 2004/0141502 A1 | 7/2004 | Corson et al. | |
| 2004/0153767 A1 | 8/2004 | Dolgonos | |
| 2004/0229624 A1 | 11/2004 | Cai et al. | |
| 2005/0090235 A1 | 4/2005 | Vermola et al. | |
| 2005/0117070 A1 | 6/2005 | Wu et al. | |
| 2005/0118946 A1 | 6/2005 | Colban et al. | |
| 2005/0130661 A1 | 6/2005 | Aerrabotu et al. | |
| 2005/0157735 A1* | 7/2005 | Kan et al. | 370/412 |
| 2005/0286408 A1 | 12/2005 | Jin et al. | |
| 2006/0025079 A1 | 2/2006 | Sutskover et al. | |
| 2006/0034250 A1 | 2/2006 | Kim et al. | |
| 2006/0039285 A1 | 2/2006 | Chapman et al. | |
| 2006/0079224 A1 | 4/2006 | Welnick et al. | |
| 2006/0088023 A1 | 4/2006 | Muller | |
| 2006/0128426 A1 | 6/2006 | Van Rooyen | |
| 2006/0153132 A1 | 7/2006 | Saito | |
| 2006/0153147 A1 | 7/2006 | Chillariga et al. | |
| 2006/0153227 A1 | 7/2006 | Hwang et al. | |
| 2006/0153232 A1 | 7/2006 | Shvodian | |
| 2006/0205406 A1 | 9/2006 | Pekonen et al. | |
| 2006/0227718 A1 | 10/2006 | Wang et al. | |
| 2006/0233359 A1 | 10/2006 | Jung et al. | |
| 2006/0239264 A1 | 10/2006 | Kang et al. | |
| 2006/0244865 A1 | 11/2006 | Simon | |
| 2006/0246890 A1 | 11/2006 | Yasuda et al. | |
| 2006/0262744 A1 | 11/2006 | Xu et al. | |
| 2006/0262751 A1 | 11/2006 | Vermola et al. | |
| 2006/0262793 A1 | 11/2006 | Vare et al. | |
| 2006/0268673 A1 | 11/2006 | Roh et al. | |
| 2006/0285508 A1 | 12/2006 | Vermola et al. | |
| 2007/0026866 A1 | 2/2007 | Krishnamurthi et al. | |
| 2007/0070180 A1 | 3/2007 | Van Rooven | |
| 2007/0091857 A1 | 4/2007 | Elstermann | |
| 2007/0165104 A1 | 7/2007 | Khan et al. | |
| 2007/0165575 A1* | 7/2007 | Niwano | 370/335 |
| 2007/0171910 A1 | 7/2007 | Kumar | |
| 2007/0223612 A1 | 9/2007 | Simon | |
| 2007/0240188 A1 | 10/2007 | Vermola et al. | |
| 2007/0249380 A1 | 10/2007 | Stewart et al. | |
| 2008/0008176 A1 | 1/2008 | Lim et al. | |
| 2008/0037460 A1 | 2/2008 | Venkatachalam | |
| 2008/0152018 A1 | 6/2008 | Ma et al. | |
| 2008/0170529 A1 | 7/2008 | Connors et al. | |
| 2008/0170530 A1 | 7/2008 | Connors et al. | |
| 2008/0198785 A1 | 8/2008 | Huang | |
| 2008/0205322 A1 | 8/2008 | Cai et al. | |
| 2008/0259813 A1* | 10/2008 | Matta et al. | 370/252 |
| 2009/0028276 A1 | 1/2009 | Van Rooyen | |
| 2009/0129334 A1 | 5/2009 | Ma et al. | |
| 2009/0219909 A1 | 9/2009 | Ko et al. | |
| 2009/0252070 A1 | 10/2009 | Connors et al. | |
| 2010/0020686 A1* | 1/2010 | Lee et al. | 370/231 |
| 2010/0077173 A1* | 3/2010 | Rao et al. | 711/170 |
| 2010/0177643 A1* | 7/2010 | Matta et al. | 370/248 |
| 2010/0241613 A1* | 9/2010 | Rao | 707/640 |

FOREIGN PATENT DOCUMENTS

| | | |
|---|---|---|
| EP | 1237371 | 9/2002 |
| EP | 1 594 330 | 11/2005 |
| EP | 1594330 A | 11/2005 |
| JP | 2006-081171 | 3/2006 |
| JP | 2006081171 A | 3/2006 |
| KR | 10-2004-0000953 | 1/2004 |
| KR | 2004-0000953 | 1/2004 |
| KR | 2005-0017046 | 2/2005 |
| KR | 20050017046 A | 2/2005 |
| WO | 01/50782 | 7/2001 |
| WO | 0150782 | 7/2001 |
| WO | 03-030451 | 4/2003 |
| WO | 03/030451 | 4/2003 |
| WO | 03/081938 | 10/2003 |
| WO | 03/081938 A | 10/2003 |
| WO | 2006/047941 | 5/2006 |
| WO | 2006047941 | 5/2006 |
| WO | 2006/099322 | 9/2006 |
| WO | 2006/105010 | 10/2006 |
| WO | 2006/138556 | 12/2006 |

OTHER PUBLICATIONS

"Mobile WiMAX—Part 1: A Technical Overview and Performance Evaluation," WiMAX Forum, pp. 1-53 (Aug. 2006).

"Mobile WiMAX—Part II: A Comparitive Analysis," WiMAX Forum, pp. 1-47 (May 2006).

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e—2005 and IEEE Std. 802.16—2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

Wang et al., "System Architecture and Cross-Layer Optimization of Video Broadcast over WiMAX", IEEE Journal on Selected Areas in Communications, vol. 25, No. 4, May 2007, pp. 712-721.

Faria et al., "DVB-H: Digital Broadcast Services to Handheld Devices", Proceedings of the IEEE, vol. 94, No. 1, Jan. 2006, pp. 194-209.

"Mobile WiMAX—Part II: A Comparative Analysis", WiMAX Forum, May 2006, pp. 1-47.

Qualcomm Incorporation, "MediaFlo Technology Overview", 2007,www.qualcomm.com/mediaflo.

Digital Video Broadcasting (DVB); Transmission System for Handheld Terminals (DVB-H), ETSI EN 302 304 V1.1.1 (Nov. 2004) European Standard (Telecommunications series).

Qualcomm Incorporation, "Flo Technology Brief", 2005, www.qualcomm.com/mediaflo.

Qualcomm Incorporation, "MediaFlo System", 2005, www.qualcomm.com/mediaflo.

International Search Report/Written Opinion issued in PCT/US08/50500 on May 26, 2008.
International Search Report/Written Opinion issued in PCT/US08/50743 on May 13, 2008.
International Search Report/Written Opinion issued in PCT/US08/50719 on Jun. 24, 2008.
Partial International Search Report issued in PCT/US08/50369 on Jun. 26, 2008.
International Search Report/Written Opinion issued in PCT/US08/50302 on Jul. 9, 2008.
International Search Report/ Written Opinion issued in PCT/US2008/057883 on Jul. 29, 2008.
Qualcomm Corporation, "Flo Technology Brief," www.qualcomm.com/mediaflo (2005).
Qualcomm Corporation, "MediaFlo System," www.qualcomm.com/mediaflo (2005).
Qualcomm Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).
International Search Report and Written Opinion for PCT/US2008/060518 issued Sep. 4, 2008.
International Search Report and Written Opinion for PCT/US2008/060517 mailed Aug. 27, 2008.

* cited by examiner

MACRO-DIVERSITY REGION RATE MODIFICATION

RELATED APPLICATIONS

This application claims the benefit of U.S. Provisional Patent Applications Ser. No. 60/912,661, filed Apr. 18, 2007, entitled "Base Station Synchronization For a Single Frequency Network," Ser. No. 60/953,452, filed Aug. 1, 2007, entitled "Base Stations Synchronization For a Single Frequency Network," and Ser. No. 60/971,837 filed Sep. 12, 2007, entitled "Base Station Synchronization For a single Frequency Network" which are hereby incorporated by reference in their entirety.

BACKGROUND

1. Field

The present disclosure relates generally to a wireless communication system and in particular to a wireless broadcast communication system.

2. Background

Wireless communication networks typically have a plurality of servicing base stations which receive and transmit signals to users' devices within the service area of the respective base stations. Communication between a user and their respective base station is maintained as a user moves about the network service area by handing off the user from one base station to another.

Many new services are being offered to customers of wireless communication carriers. One such service is providing customers with multimedia content via the wireless communication network. For example, it is desired to provide audio/video content to customers as they move about the network.

Providing multimedia content via wireless communication networks presents several challenges. For example, it is desirable for the average outgoing rate of content data to match the average incoming rate of content data. Known methods and systems have provided some improvements to match the rates but still fall short.

Therefore, there is a need for improved systems, apparatus, and techniques for receiving broadcasting content, to ensure that data is smoothly transmitted to end users and that the buffer on the network side does not become overloaded.

SUMMARY

The present disclosure includes methods, apparatuses, and systems as described in the written description and claims. In one embodiment, a macro-diversity region control module for adjusting the size of macro-diversity regions to be transmitted in frames from one or more base stations includes a buffer that may be part of the macro-diversity region control module or may be external but coupled to the macro-diversity region control module. The macro-diversity region control module may also have a receiving module, a controller module and a communication module. The buffer may be coupled to the receiving module and configured to receive and store a stream of content data. The receiving module may be configured to receive a plurality of packets of content data from the buffer. The controller module may be coupled to both the receiving module and the communication module.

The controller module may receive content data from the receiving module and generate a macro-diversity region. In one embodiment the controller module may allocate at least a portion of the content data to the macro diversity region. The controller module may include control information to the macro-diversity region data. The amount of content data in the buffer may vary continuously depending on the instantaneous incoming data rate of the content data received at the buffer and the instantaneous outgoing data rate. The controller module may also be configured to monitor the amount of content data in the buffer to determine whether the amount of content data in the buffer is outside a target range which may be defined by configuration parameters, for example a low-end value and a high-end value. Further the controller module may adjust the size of the macro-diversity region by one or more increments, for example symbols, in response to the amount of content data in the buffer going outside the target range.

Other examples of the controller module functions include determining the macro-diversity region size based at least in part on an incoming rate of the content data. In other embodiments the controller module may be configured to allocate at least a portion of the content data to a macro-diversity region, identify a predetermined time interval to change the size of the macro-diversity region and adjust the size of the macro-diversity region during the predetermined time interval when the incoming data rate or the amount of data in the buffer crosses a threshold and to identify a transition frame structure for a transition frame to increase the macro-diversity region from one size to another. The communication module may be coupled to the controller module and configured to establish a communication link with one or more base stations and to transmit the macro-diversity data region to the one or more base stations.

A method of adjusting the size of the macro-diversity region may be implemented in the macro-diversity region control module. In one embodiment the method includes receiving and storing content data into a buffer. The macro-diversity region size is determined based on a set of pre-selected configuration parameters including an average incoming rate of the stream of content data. At least a portion of the content data may be allocated to a macro-diversity region. The amount of content data in the buffer may be monitored to determine whether the amount of content data in the buffer exceeds a target range which may be defined by configuration parameters. In addition the size of the macro-diversity region may be adjusted by one or more increments, for example symbols, in response to the amount of the content data in the buffer going outside the target range.

The size of the macro-diversity region may be maintained in response to a determination that the amount of content data in the buffer falls within the target range. Further a notification procedure may be invoked in response to a determination that the amount of content data in the buffer is above the high-end value or is below the low-end value. The size of the macro-diversity region may be increased in response to a determination that the amount of content data in the buffer is above a high-end value or decreased in response to a determination that the amount of content data in the buffer is below a low-end value. In some embodiments the method includes transitioning from one macro-diversity region size to another via a transition frame. The macro-diversity region of a prior frame may be replaced in accordance with a replacement map specified in the transition frame. In other embodiments the method further includes incrementing or decrementing the size of a virtual buffer module in response to changes in the scheduled incoming rate and output rate of the content data in the buffer. The virtual buffer module may be configured to accommodate large bursts of content data deposits.

In another embodiment the method includes receiving and storing a stream of content data into a buffer. Identifying a predetermined time interval to change the size of the macro-diversity region and at least a portion of the content data is allocated to a macro-diversity region. The size of the macro-diversity region is then adjusted during the predetermined time interval when the incoming rate of the content data crosses a threshold. In one embodiment the predetermined time interval is selected based on a historic traffic pattern. The macro-diversity region may be increased to accommodate an increase in the average amount of content data that is above the threshold or decreased to accommodate a decrease in the average amount of content data that is below the threshold where the threshold may be a range having a low end value and a high end value.

BRIEF DESCRIPTION OF THE DRAWINGS

These and other aspects, advantages and details of the present disclosure, both as to its structure and operation, may be gleaned in part by a study of the accompanying exemplary drawings, in which like reference numerals refer to like parts. The drawings are not necessarily to scale, emphasis instead being placed upon illustrating the principles of the present disclosure.

DETAILED DESCRIPTION

Certain embodiments as disclosed herein provide for methods and systems for adjusting a size of a macro-diversity region to be transmitted in a downlink frame, for example, from one or more Base Transceiver Stations (BTS), or base stations in a network, for example, a single frequency network. After reading this description it will become apparent how to implement the present disclosure in various alternative embodiments and alternative applications. However, although various embodiments of the present disclosure will be described herein, it is understood that these embodiments are presented by way of example only, and not limitation. As such, this detailed description of various alternative embodiments should not be construed to limit the scope or breadth of the present disclosure.

Figure 1:
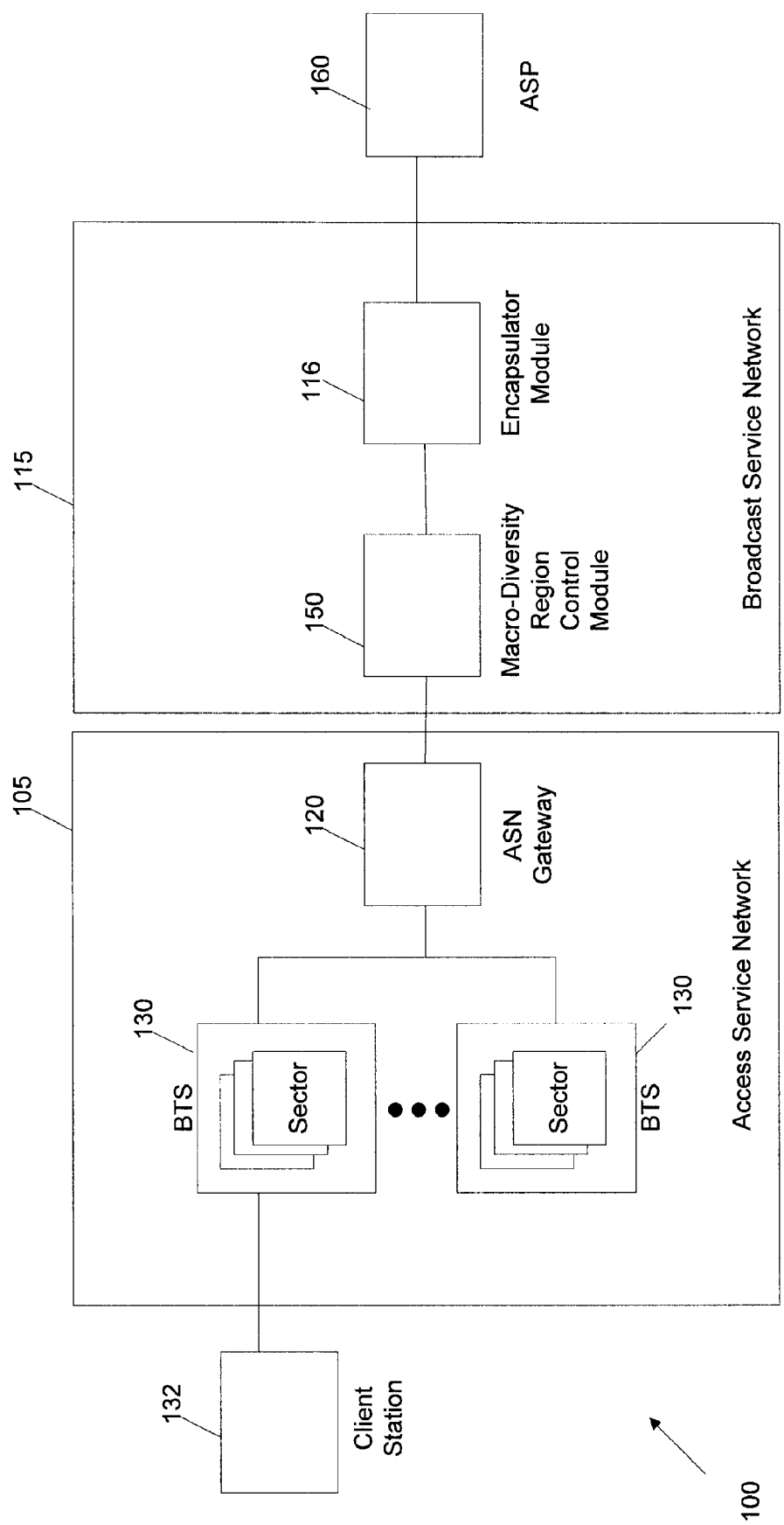
FIG. 1 is a block diagram of an example network in which a data frame comprising a macro-diversity region may be used for broadcasting data to a plurality of client stations in accordance with an embodiment.

FIG. 1 is a block diagram of an example network 100 for broadcasting data to a plurality of client stations 132 in accordance with an embodiment. For exemplary purposes, network 100 will be described with reference to a network 100 in which data is broadcast to client stations 132 using a macro-diversity region of a data frame, such as, for example, an macro-diversity region of a Worldwide Interoperability for Microwave Access Orthogonal Frequency-Division Multiple Access (WiMAX OFDMA) frame. Other exemplary embodiments utilize other frame based systems including, for example Long Term Evolution (LTE) system or other now or later developed communications systems. LTE is the name given to a project within the Third Generation Partnership Project to improve the Universal Mobile Telecommunications System (UMTS) mobile phone standard to cope with future requirements.

In the example illustrated in FIG. 1, the network 100 includes at least one client station 132, an Access Service Network (ASN) 105, a Broadcast Services Network (BSN) 115, and an Application Service Provider (ASP) 160. In the present example, ASP 160 provides one or more streams of internet protocol (IP) packets comprising content data for broadcast to the client stations 132. Broadcast services network 115, as illustrated, receives the stream(s) of IP packets and processes and packages the received content data for broadcast to client stations 132. ASN 105 may provide access services between the broadcast services network 115 and client stations 132 in transmitting the content data to the client stations 132.

As noted above, ASP 160 provides one or more IP streams comprising content data for broadcast to the client stations 132. These IP streams may be provided to the broadcast services network 115 directly or, for example, via a network (not shown), such as a local area network (LAN) (e.g., an Ethernet network), a metro area network (MAN), or a wide area network (WAN) (e.g., the Internet), or a combination thereof.

As noted above, this content data may comprise, for example, audio (e.g., music, speech, etc.), visual (e.g., pictures, images, movies, television, etc.), textual (e.g., word processing documents, spreadsheets, etc.), or other types of data regarding content of interest to a user. For explanatory purposes, the provided content data will be described as being audio/visual data. Further, in an embodiment, each provided IP stream may comprise content data for a particular audio/visual channel, such as, for example, one or more IP streams may comprise content data for providing a television news program (e.g., CNN, Fox News, etc.), one or more IP streams may be provided for broadcasting movies, one or more IP streams may be provided for transmitting sports programs, etc.

In an embodiment, a broadcast service provided by a particular ASP 160 is identified by a single broadcast channel identifier (CID). As noted above, a broadcast service refers to a collection of content data that may be encoded using a common encoding scheme, such as, for example, (Moving Picture Experts Group) MPEG at a particular resolution (e.g., low resolution for small screens such as mobile phones, high resolution for high definition television (HDTV), etc.). This broadcast CID may then be used by the client stations 132 to determine if the broadcasted content data comprises content data that the client station desires to receive (e.g., the broadcasted content data is for a broadcast service to which the client station subscribes). For example, in an embodiment, there may be multiple ASPs 160 each providing a different broadcast service, where a client station 132 may only be enabled to receive and provide content data belonging to a particular broadcast service (e.g., the client station may only subscribe to the broadcast service proved by one particular ASP).

As illustrated, broadcast service network 115 may include an encapsulator module 116 and a macro-diversity region control module 150. In one embodiment the macro-diversity region control module 150 may be part of, for example, the ASN Gateway 120, or a Network Manager, or other entity. The choice of the entity on which this functionality resides may vary depending on, for example the infrastructure vendor. In addition, the functionality may be distributed across multiple entities. Essentially, the Broadcast Service Network (BSN) and Access Service Network (ASN) blocks are for explanatory purposes, and in some embodiments, the MBS controller or macro-diversity region control module 150 and encapsulator may exist elsewhere and the BSN may be optional. In some embodiments, the macro-diversity region control module 150 and encapsulator may be in the ASN, or in the ASP. Broadcast service network 115 may be operated by a single network service provider (NSP). Further, although for simplification only a single broadcast service network is illustrated, it should be understood that in application there may be multiple broadcast service networks 115 each operated by a different NSP. These other broadcast services networks may be connected to different ASNs 105 and ASPs 160, or for example, multiple broadcast service networks may be connected to a particular ASN and/or ASP.

Encapsulator module 116 may receive the IP streams from ASP 160 and time slice the received IP packets. Encapsulator module 116 may then package the time sliced IP packets into transport packets for wireless transmission of the content data. As used herein, a transport packet refers to any type of data packet useable for transporting data, and may use any type of format or protocol in transporting the data. For example, in an embodiment in which the content data comprises audio/visual content, the encapsulator module 116 may time slice the received IP packets and package the time sliced IP packets in transport packets, such as, for example, Motion Picture Expert Group 2 (MPEG-2) transport packets. Further, in an embodiment, the encapsulator module 116 may perform time slicing operation in accordance with the European Telecommunications Standards Institute (ETSI) standard for Digital Video Broadcast—Handheld (DVB-H) along with performing multi-protocol encapsulation with forward error correction (MPE-FEC). Additionally, in an embodiment, the encapsulator module 116 may wrap the packets (e.g., transport packets) with an IP header prior to outputting the wrapped packets.

The encapsulator module 116 may then provide the transport packets to the macro-diversity region control module 150. The macro-diversity region control module 150 may then package the transport frames for broadcast to the client station 132. Additionally, in an embodiment, the macro-diversity control module 150 may further insert time stamping information in the received transport packets. The time stamping information added to the transport packets (e.g., MPEG-2 transport packets) may be used by the base stations to enable the individual base stations 130 to time synchronize the transmission of the content data to the client stations 132, so that each base station 130 simultaneously transmits the content data. Further, in an embodiment, the macro-diversity region control module 150 may further combine multiple received transport packets into a larger frame (referred to herein as a "mega-frame") for transmission by the base stations 130.

In an embodiment, the macro-diversity region control module 150 defines a macro-diversity region for inclusion in a data frame for transmitting the content data to the client stations 132. For example, the macro-diversity region defined may be a Multicast Broadcast Services (MBS) region of an OFDMA data frame, such as, for example, an OFDMA data frame in accordance with Institute of Electrical and Electronics Engineers (IEEE) 802.16e. A further description of the macro-diversity region is provided below.

As illustrated, ASN 105 includes a plurality of base stations 130 and an ASN Gateway 120. In one embodiment, base stations 130 may include an antenna system that is sectorized into one or more sectors with each sector transmitting and receiving signals within a corresponding coverage area, wherein the coverage area of the sector may be the same or less than the total coverage area of the base station. ASN Gateway 120 may provide access gateway functions between the base stations 130 and the broadcast service network 115. It should be further noted that although an ASN Gateway is used in the exemplary embodiment of FIG. 1, in other embodiments an ASN Gateway need not be used.

The defined macro-diversity region may then be communicated to the base stations 130. The base stations 130 may comprise hardware (e.g., a processor, memory, one or more buses, etc.) and software for building data frames including the defined macro-diversity region using the information received from the macro-diversity region control module 150, These data frames may be, for example, OFDMA data frames in accordance with IEEE 802.16e. The base stations 130 may then broadcast the OFDMA data frames including the macro-diversity region. Further, the base stations 130 may be synchronized so that the macro-diversity regions transmitted by the base stations 130 are identical and synchronized. It should be noted that although in this embodiment each base station 130 simultaneously broadcasts a common macro-diversity region, the remainder of the data frames transmitted by each base station 130 need not include common data. A further description of an exemplary data frame comprising a macro-diversity region is presented below.

Client stations 132 may be mobile, nomadic or stationary units. The client stations 132 are often referred to as, for example, mobile stations, mobile units, subscriber stations, wireless terminals or the like. Client station 132 may be, for example, a wireless handheld device, a vehicle mounted device, a portable device, client premise equipment, fixed location device, wireless plug-in accessory or the like. In some cases, client stations 132 may take the form of a handheld computer, a notebook computer, a wireless telephone, personal digital assistant, wireless email device, personal media player or the like. Further, client stations 132 may include a receiver that receives signals broadcasted by ASN 105. Client station 132 may also include one or more displays (e.g., a liquid crystal display (LCD), etc.) and speaker(s) for use in presenting content (e.g., audio and/or visual) to a user of the client device. Optionally, the client station 132 may also include a storage device (e.g., volatile or non-volatile memory) for recording the received data.

It should be noted that although FIG. 1 illustrates exemplary modules for processing the incoming content data for transmitting the content data to the client stations 132 using a macro-diversity region, in other embodiments alternate modules may be used or, for example, the functions performed by the modules may be combined or split into different modules. For example, although FIG. 1 illustrates a macro-diversity control module 150 for time stamping the incoming data and defining a macro-diversity region, in other embodiments, these functions may be split into separate modules. For example, in an embodiment, a single frequency network (SFN) module may be used that time stamps the incoming content data and packages the transport packets into mega-frames that it then communicates to the macro-diversity control module over a network, such as an Ethernet network. The macro-diversity control module in such an example, may then define the macro-diversity region using the time stamped information received from the SFN module.

Figure 2:
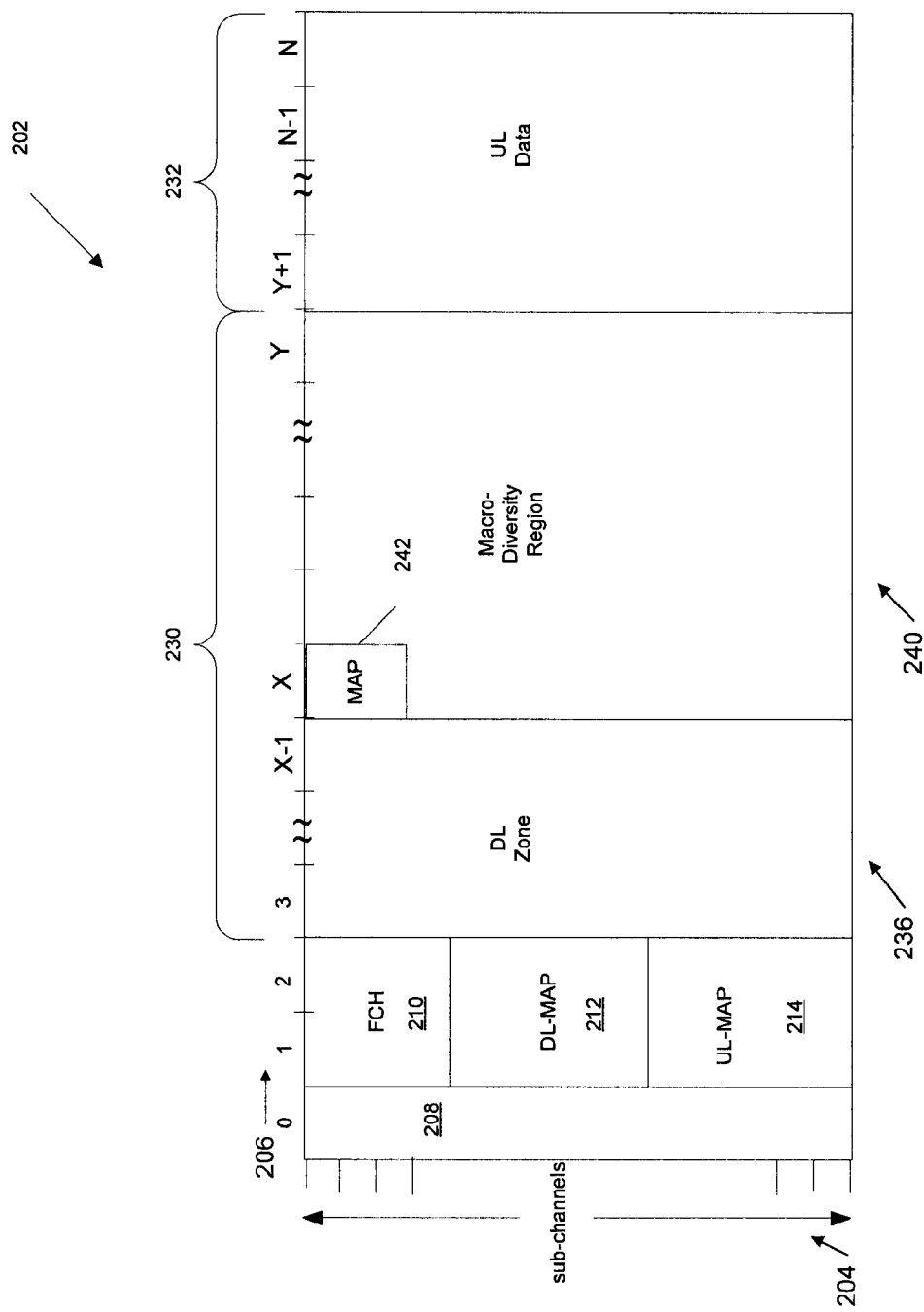
FIG. 2 is a diagram illustrating an example data frame structure that may be used to transmit data between a base station and a client station in accordance with an embodiment.

FIG. 2 is a diagram illustrating an example data frame structure that may be used to transmit data between a base station 130 and a client station 132. As noted above, in an embodiment, this data frame may be built by the base stations 130. As illustrated, the data frame 202 structure may be divided into multiple sub-channels 204 (along the vertical axis in FIG. 2), with each sub-channel using a carrier frequency that is orthogonal to the carrier frequencies of other sub-channels. The frame 202 is also divided in time into symbol periods 206 (along the horizontal axis in FIG. 2). As illustrated in FIG. 2, in data frame 202, data may be carried on each of the sub-channel carrier frequencies 204 simultaneously during individual symbol periods 206. Further, a group of consecutive symbols may be treated as a symbol groups, such that the frame 202 is split into a fixed number of symbol groups each consisting of a particular number (e.g., 2, 4, etc.) of consecutive symbols.

In the example of FIG. 2, the data frame 202 includes a preamble 208 during symbol period 0. During symbol periods 1 and 2, the data frame 202 includes a frame control header (FCH) 210 and a downlink media access protocol (DL-MAP) 212 and uplink media access protocol (UL-MAP) 214. Generally, the FCH 210 may include information about the frame 202 configuration, such as coding schemes, message lengths, usable sub-channels, and the like. The FCH 210 can also carry overhead messages that include information broadcast from a base station 130 to at least one client station 132. Alternatively, overhead messages can be included in other portions of the data frame 202.

The downlink and uplink maps 212 and 214 include information about the location of downlink and uplink content within the data frame 202 or a subsequent frame. The data frame 202 includes a downlink region 230 and an uplink region 232 defined by the downlink and uplink maps. Included in the downlink region 230 is a downlink data region 236 and a macro-diversity region 240. While FIG. 2 illustrates an example of the macro-diversity region 240 being located at the end of the downlink region 230, in other embodiments the macro-diversity region 240 can be located at other positions in the downlink region 230.

The downlink region 230 may be used for transmitting information from the base stations to the client stations, while the uplink region 232 may be used for transmitting information in the opposite direction, i.e., from the client stations to the base stations. Further, as illustrated, a management messages may be transmitted from the base stations 130 to the client stations 132 in the downlink data region 236 of the downlink region 240. These management messages may be, for example, Media Access Control (MAC) management messages. Further, in an embodiment, MAC management messages broadcasted to the client stations may be included in the initial (i.e., far left) portion of the downlink data region 236 with traffic bearing data (e.g., Voice over IP traffic (VOIP), World Wide Web (WWW) data, etc.) and other types of data (e.g., uni-cast MAC management messages) following the broadcasted MAC management messages in the downlink data region 236. Similarly, MAC management messages transmitted from the client stations to the base stations may use the uplink region 232 of the data frame 202. As will be discussed in further detail below, in an embodiment, a MAC management message identifying the content data broadcasted in the macro-diversity region may be broadcast to the client stations using the downlink data region 236 and broadcasted in the same or similar manner that other MAC management messages are broadcast to the client stations.

As illustrated, the macro-diversity region 240 may include a macro-diversity region map 242 that defines the size and content of the macro-diversity region 240. In one embodiment, the macro-diversity map 242 rather than defining the macro-diversity region 240 for the data frame 202 the map 242 resides in, the macro-diversity region map 242 defines the size and content of a macro-diversity region 240 in a subsequent data frame 202. For example, the macro-diversity map 242 may define the size and content of a macro-diversity region in the next data frame in time (i.e., the frame sent immediately after the data frame in which the map 242 resides), or the second data frame 202 following the current frame, or other subsequent data frames of data. The map 242 may further include an information element (IE) including a broadcast CID that identifies the broadcast service(s) included in the macro-diversity region 240, or multiple broadcast CIDs in embodiments in which the macro-diversity region 240 includes content data belonging to different broadcast services.

In an embodiment, the base stations 130 may transmit the different regions of frame 202 using different modulation schemes. In some embodiments the base stations 130 may transmit within each region using different modulation schemes. For example, in an embodiment, the base stations may use a simple modulation for transmitting the preamble 208 (e.g., BPSK), a different modulation scheme for transmitting the downlink data region (e.g., QPSK), yet another modulation scheme for transmitting the macro-diversity region 240 (e.g., QAM), and yet another modulation scheme for transmitting the uplink region 232 (e.g., QPSK).

Figure 3:
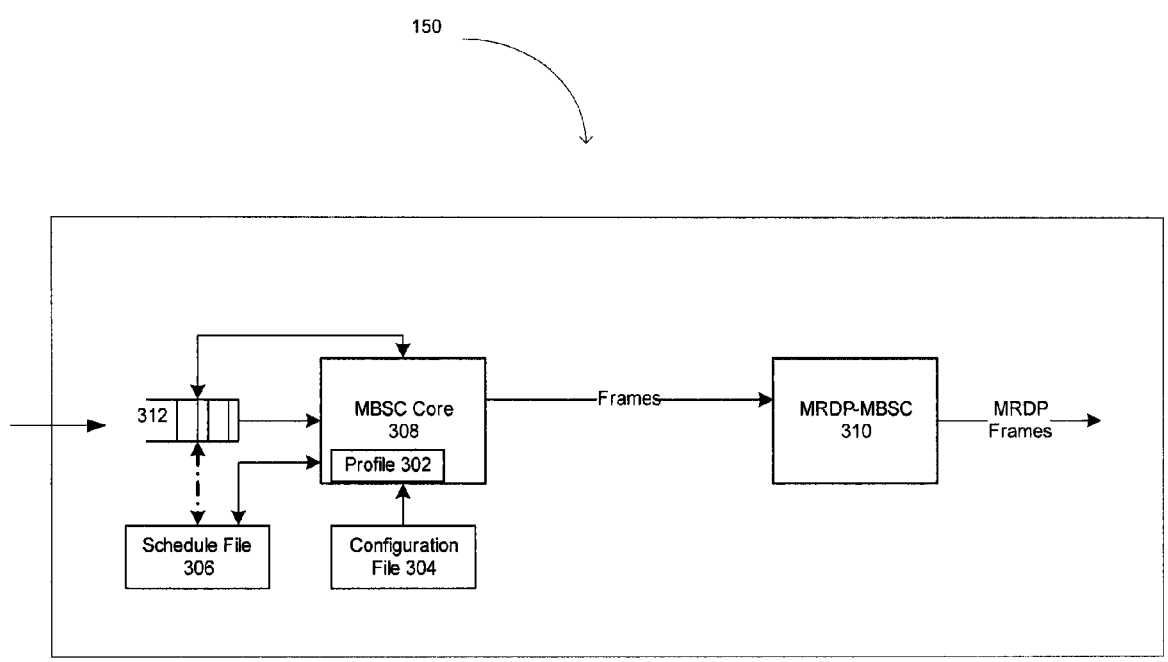
FIG. 3 illustrates an example of the operation or function of a macro-diversity region control module in accordance with an embodiment.

FIG. 3 illustrates an example of the operation or function of a macro-diversity region control module 150 illustrated in FIG. 1 in accordance with an embodiment. For explanatory purposes, FIG. 3 will be discussed with reference to the above-discussed FIG. 1. Note that in FIG. 1 the broadcast data flows from right to left while in FIG. 3 the broadcast data flows from left to right.

As noted above in describing FIG. 1, in an embodiment, the macro-diversity region control module 150 may be, for example, a Multicast Broadcast Service Controller (MBSC). As illustrated, the macro-diversity region control module 150 may have a buffer 312 that may be part of the macro-diversity region control module 150 or may be external but coupled to the macro-diversity region control module 150. The macro-diversity region control module may also have a macro-diversity region control module core 308 or MBSC core coupled to the buffer 312. The macro-diversity region control module 150 behavior may be controlled by three data sets. Each one of these data sets may be stored in an Extensible Markup Language (XML) file, stored by for example a storage (E.g. volatile or nonvolatile RAM, ROM etc.) in the macro-diversity region control module 150. However these three data sets are only one means of configuring the macro-diversity region control module 150. Other means for configuring the macro-diversity region control module 150, for example loading parameters to MIB over SNMP, may be appropriate. These three files are collectively referenced as setup files and include a Profile File 302, a Configuration File 304 and a Schedule File 306. The Profile File 302, Configuration File 304 and a Schedule File 306 may be generated manually by an administrator, for example an engineer, or by a program outside the macro-diversity region control module 150, and uploaded to the macro-diversity region control module 150. The macro-diversity region control module 150 can also include a macro-diversity region control module core 308 and an MBS Region Distribution Protocol (MRDP)-MBSC interface 310. The Profile File 302 includes a profile that sets the most basic and long term parameters of the macro-diversity region control module 150. A profile change may be, for example, a major change and in some embodiments requires a system reset. For example, in a system employing WiMax in accordance with 802.16, exemplary parameters stored by the profile may include the following:

- The output burst type (E.g. hybrid automated repeat request (HARQ) or convolution codes (CC)/convolution turbo codes (CTC)) to be used in transmitting the macro-diversity region;
- The number of subchannels allocated to the macro-diversity region;
- The permutation type to be used by the base stations in transmitting on the downlink, where the permutation type is a scheme for mapping sub-channels to physical sub-carriers in an OFDMA symbol. (E.g. full usage of sub-carriers (FUSC—this scheme makes up sub-channels by using total sub-carriers assigned for data in total frequency bands), partial usage of sub-carriers (PUSC—this scheme makes up sub-channels by using a portion of sub-carriers assigned for data in total frequency bands), adaptive modulation and coding (AMC—this scheme makes up sub-channels by dividing adjacent bands in total frequency bands));
- The modulation type, for example quadrature phase-shift keying (QPSK), quadrature amplitude modulation (QAM) or 64 QAM, to be used in transmitting the macro-diversity region;
- A backlog target delay (E.g. specified in terms of milliseconds), for example: this parameter states the target average amount of time each data byte stays in the buffer 312 before being allocated to the macro-diversity region;
- One or more macro-diversity frame descriptors for defining the structure of the macro-diversity region (Note that in an alternative embodiment, one or more frame region descriptors may be included in a frame lookup table included in the macro-diversity profile);
- The number of frame descriptors specified in the lookup table: the maximum macro-diversity width can be described in this profile;
- MBS information element (IE) which specifies constant bit fields of the macro-diversity region;
- Cyclic redundancy check-32 (CRC-32) amend: if this option is set, the last four bytes of each PDU will be CRC-32. (CRC is a common technique for detecting data transmission errors).

In one embodiment an active profile can be specified via a Management Information Base (MIB) entry where the term active profile refers to the system profile that is currently in use.

The Configuration File 304 may include a number of configuration settings with each configuration setting having one or more parameters governing the behavior of the macro-diversity region control module 150 at a given data rate or at a range of subset of data rates. Generally, the Configuration File may change when, for example, the incoming data rate or number of channels over the air changes, with the new Configuration File having different values for the parameters. In an exemplary system employing WiMax in accordance with 802.16 some examples of the configuration parameter may include:

- Incoming data rate in bits per second;
- Maximum macro-diversity region width at the specified incoming data rate in terms of the number of symbol groups;
- The number of symbols in the DL sub-frame to be used by the base stations in transmitting to the client stations;
- An MBS_IE overwrite pattern that can be encoded in Base-64; for example, an MBS_IE overwrite pattern may be included that specifies the location of bits in an MBS_IE stored by the Profile File 302 that can be overwritten (overwriting parameters includes overwrite location (pattern) and overwrite value, where the overwrite value may be one of the configuration parameters);
- An MBS_MAP overwrite pattern encoded in base-64 that specifies the location of bits in an MBS_MAP stored by Profile File 302 that may be overwritten;
- One or more backlog tolerance margins that specify the percentage of high and low levels of content data in the buffer 312, for example, for a target backlog buffer level of 1000 bytes the backlog tolerance margins may be between 1004 and 997 bytes;
- The feedback loop delay specifies the minimum number of OFDMA frames between two consecutive measurements of the backlog level after any width change of the macro-diversity region frame;
- A downstream target delay that specifies the amount of time between generation of a frame and its over the air broadcast; this target delay may be used in time stamping of generated frames that will be discussed further in detail below; Further this target delay, in some embodiments, may be selected large enough to take into account for distribution of the frame to all base stations in the network;
- An interface protocol type for use in communications between the macro-diversity region control module 150 and the ASN-GW 120;
- A minimum starting symbol such that the macro-diversity region may not occupy a symbol period smaller than this parameter;
- A maximum finishing symbol such that the macro-diversity region may not occupy a symbol period after this parameter and frame descriptor.

In some embodiments, the configuration setting may adjust the set of system parameters that are dependent on the incoming rate and are susceptible to change as a result of the change in the incoming rate. The set of system parameters may be a group of dependent parameters that usually need to change together. Some of these system parameters are loosely dependent on the information in the profile 302, but they may also identify shorter term rate dependent behavior of the system. In one embodiment, the Configuration File 304 may be generated manually by an administrator, for example an engineer, or by a program outside the macro-diversity region control module 150. The Configuration File may be generated with knowledge of the active profile in use and may be consistent with the active profile, where the term active profile refers to the system profile that is currently in use. The configuration file may be uploaded and stored in the macro-diversity region control module 150.

The Schedule File 306 includes a plurality of schedule entries defining a schedule of rate changes. The set of parameters associated with the Schedule File 306 may specify what input rates may be expected at any given time. In one embodiment Schedule File 306 may be loaded to the MBSC management information base (MIB) such that it can be updated via a Simplified Network Management Protocol (SNMP) connection. The MIB refers to a database of system parameters which can be queried and changed (with some access provisions) remotely via the SNMP protocol. Each schedule entry includes a specified instance of time and a specified input rate to indicate the specified instance of time the next rate change schedule becomes effective. The macro-diversity region control module 150 chooses the configuration setting that provides the best match for the data rate specified by the Schedule File 306 for the current instance of time. Profile Files 302 and Configuration Files 304 are usually static elements of the system.

The macro-diversity region control module may provide the capability of changing the active Configuration File. A MIB element may specify the new Configuration File along with the time of the change of the Configuration File. The new Configuration File may become effective at the scheduled rate change that coincides with the time specified in the MIB entry. The fundamental behavior of the macro-diversity region control module may be regulated by a set of parameters specified by the active profile. The macro-diversity region control module core 308 may extract the frame structure, for example frame length, from the Profile File 302, populate the frame and send the populated frame to an interface 310 that may use a proprietary interface, for example MRDP-MBSC, where the populated frame may subsequently be transmitted to the ASN-GW 120, for example. The MRDP-MBSC 310 may be an application layer protocol that runs at the macro-diversity region control module 150, and serves as the interface to external devices, for example, the ASN-GW 120 illustrated in FIG. 1.

In one embodiment, the macro-diversity region control module 150 may adopt a configuration setting based on the Schedule File 306. The configuration setting specifies the incoming data rate from the IP encapsulator 116 illustrated in FIG. 1. The incoming data stream may be deposited into the buffer 312, where the macro-diversity region control module core 308 can monitor the backlog level of the buffer 312 and keep the backlog level within a target range. The macro-diversity region control module core 308 can keep the backlog within a target range by controlling the outgoing data rate by changing the width of the macro-diversity region. This process of balancing the incoming data rate with the outgoing data rate can be decided by a buffer balancing algorithm and is referred to as herein as rate matching. These OFDMA frames may be described in the profile according to the Configuration File 304 and the Profile File 302. The frame description may define the structure of the macro-diversity region including the structure of the frame and how it actually will be filled with data bytes. The macro-diversity region control module fills up each frame with data bytes from the buffer 312 in accordance with the specified frame structure. The macro-diversity region control module -Core 308 may be configured to build macro-diversity region frames and maintain the backlog level of the buffer 312 within a range by controlling the outgoing rate of content data in the buffer 312. The macro-diversity region control module core 308 controls the outgoing rate of content data by changing the width of the macro-diversity region frames.

Figure 4:
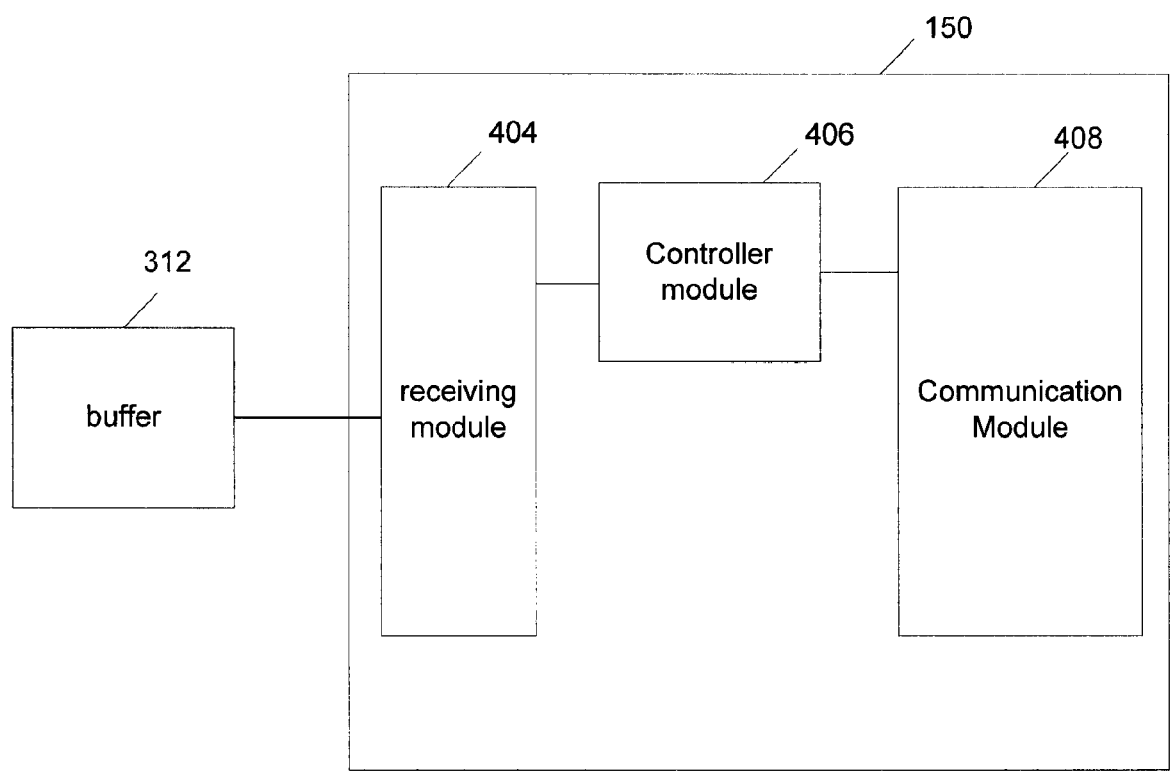
FIG. 4 illustrates an alternative example of a macro-diversity region control module for adjusting the size of a macro-diversity region in accordance with an embodiment.

FIG. 4 is an example of a macro-diversity region control module 150 illustrated in FIG. 1 according to an embodiment. For explanatory purposes, FIG. 4 will be discussed with reference to the above-discussed FIG. 1. As illustrated, the macro-diversity region control module 150 may have a buffer 312 described in reference to FIG. 3 above that may be part of the macro-diversity region control module 150 or may be external but coupled to the macro-diversity region control module 150. The macro-diversity region control module 150 may also have a receiving module 404, a controller module 406 and a communication module 408. The buffer 312 may be coupled to the receiving module 404 and configured to receive and store a stream of content data. The receiving module 404 may be configured to receive a plurality of packets of content data from the buffer 312. The plurality of packets of content data may originate from an ASP 160 of FIG. 1. The controller module 406 may be coupled to both the receiving module 404 and the communication module 408.

The controller module 406 may be configured to receive content data from the receiving module 404 and may be configured to generate a macro-diversity region and allocate at least a portion of the content data to the macro diversity region. The controller module 406 may also be configured to monitor the amount of content data in the buffer 312 to determine whether the amount of content data in the buffer 312 is within a target range. This target range may be defined by configuration parameters of the Configuration File 304, for example, described in reference to FIG. 3 above, and vary depending on the size of the macro-diversity region. If the controller module 406 determines that the amount of content data in the buffer 312 is outside the target range, the controller module 406 may adjust the size of the macro-diversity region by one or more increments, for example symbols. For example, if the amount of content data in buffer 312 falls below the target range (i.e., below a minimum threshold value specifying the minimum level for the target range) the controller module 406 may decrease the size of the macro-diversity region. Or, for example, if the amount of content data in buffer 312 exceeds the target range (i.e., above a maximum threshold value specifying a maximum level for the target range), the control module 406 may increase the size of the macro-diversity region.

In some embodiments the controller module 406 may be further configured to determine the macro-diversity region size based at least in part on an specified incoming rate of content data. In other embodiments the controller module 406 may be configured to change the size of the macro-diversity region at a predetermined time and then adjust the size of the macro-diversity region after the predetermined time based on whether the incoming data rate or the amount of data in the buffer 312 crosses a threshold (e.g., a minimum or maximum threshold value specifying a target range). The predetermined time at which the new incoming data rate is expected to take effect may be defined in the Schedule File 306 described in reference to FIG. 3 above, which may further specify a time interval during which the incoming data rate is expected to remain at the specified level. The communication module 408 may be configured to establish a communication link with one or more base stations 130 and to transmit the macro-diversity data region built by the controller module 406 to the one or more base stations 130. In one embodiment communication module 408 may include or be the the MRDP interface 310 described in reference to FIG. 3 above.

Figure 5:
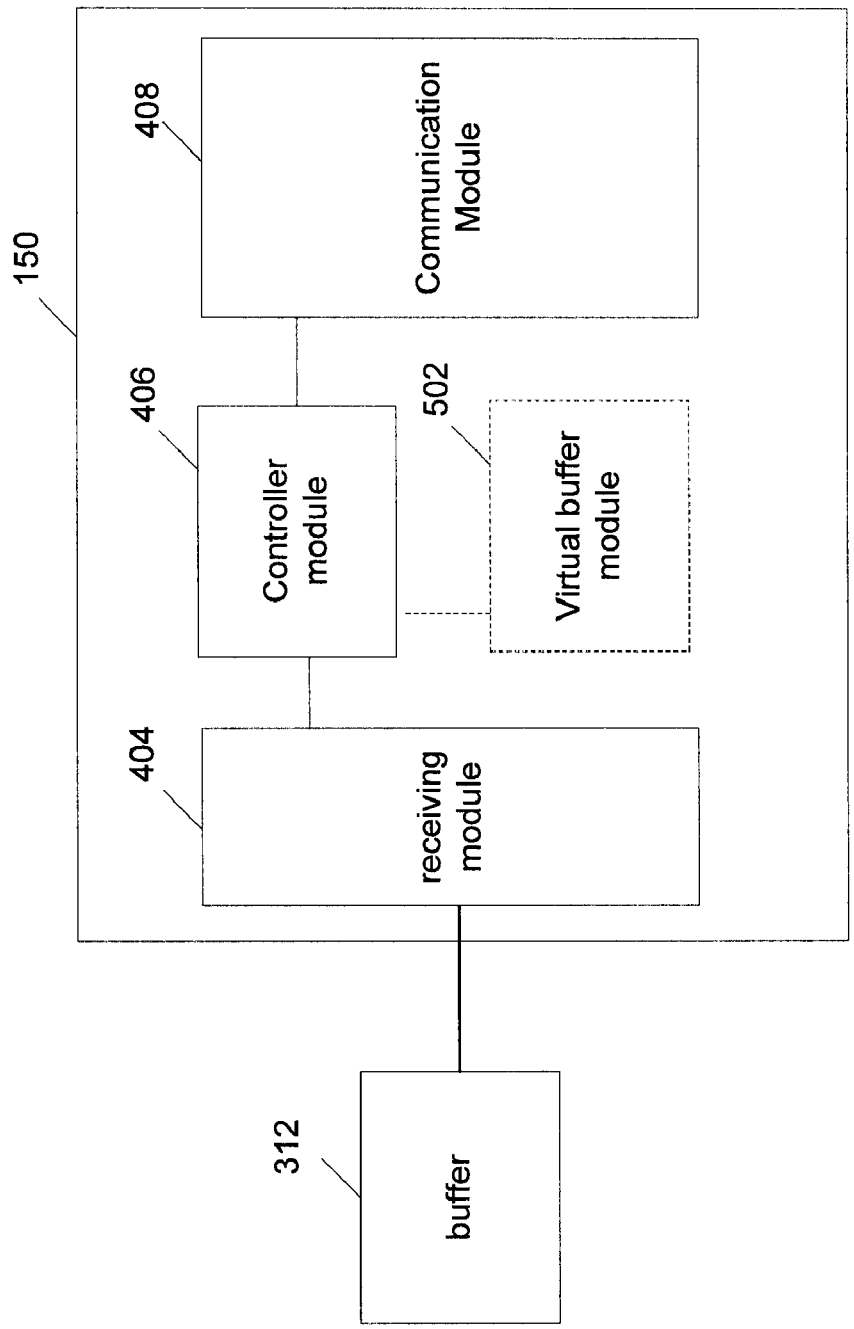
FIG. 5 is another example of a macro-diversity region control module illustrating buffer management operation in accordance with an embodiment.

An example of buffer management operation according to an embodiment will be described in reference to FIG. 5. For explanatory purposes, FIG. 5 will be discussed with reference to the above-discussed FIG. 1 and FIG. 4. Similar to FIG. 4, FIG. 5 includes a macro-diversity region control module 150 that may have a buffer 312, a receiving module 404, a controller module 406 and a communication module 408. In addition FIG. 5 includes a virtual buffer module 502 coupled to the controller module 406. In some embodiments the virtual buffer module 502 may be included in the macro-diversity region control module 150. In other embodiments the virtual buffer module 502 may be external to the macro-diversity control module 150.

Packets of content data may be delivered to the buffer 312 in large bursts and as a result the buffer level swing may be large. These swings in the buffer level may impact the rate matching process. In one embodiment the levels of the virtual buffer module 502 may be used to make rate matching decisions. The level of the virtual buffer module 502 may be indicated by a single variable and virtual buffering may be accomplished by using a counter such as a token counter. In one embodiment control module adds tokens to the virtual buffer module's counter at a scheduled rate (say R_s) and subtract tokens from the counter at the current output rate (say R_o) at every frame. The scheduled incoming rate, R_s, may be, for example, specified in the above-discussed schedule file and based on the expected incoming rate of content data packets during a particular time interval. The schedule outgoing rate, R_o may be specified in the configuration file and be based upon the current width of the macro-diversity region. In the event that R_s>R_o, the token counter value may rise every frame until the counter value reaches a maximum threshold. After which, the macro-diversity region control module 150 may increase the macro-diversity region width by one slot or symbol. The increase in the macro-diversity region width may result in restoring the rate matching balance such that R_o>R_s and as a result the counter value may start decreasing. In one embodiment, when the counter value reaches a minimum threshold the macro-diversity region control module 150 decreases the macro-diversity region width by one slot/symbol causing the counter value to start increasing. In some embodiments if the initial R_s is exactly equal to R_o, the counter value may be maintained at its initial value. Since the counter is incrementing at the presumed average incoming rate, it is not affected by the instantaneous incoming rate. At each frame time, the value of the token counter may be increased based on the scheduled incoming rate. For example, if the stated input rate is 1480000 bps, then for a 5 ms frame time, the number of bits that may be deposited in each frame is 7400. The value of token counter may be increased by 7400 every frame. The value of the counter may be decreased by the number of bits serviced in the current frame, e.g., 7500 bits. Adding to the counter may start when the input rate is triggered, i.e., when the incoming rate becomes effective.

Figure 6:
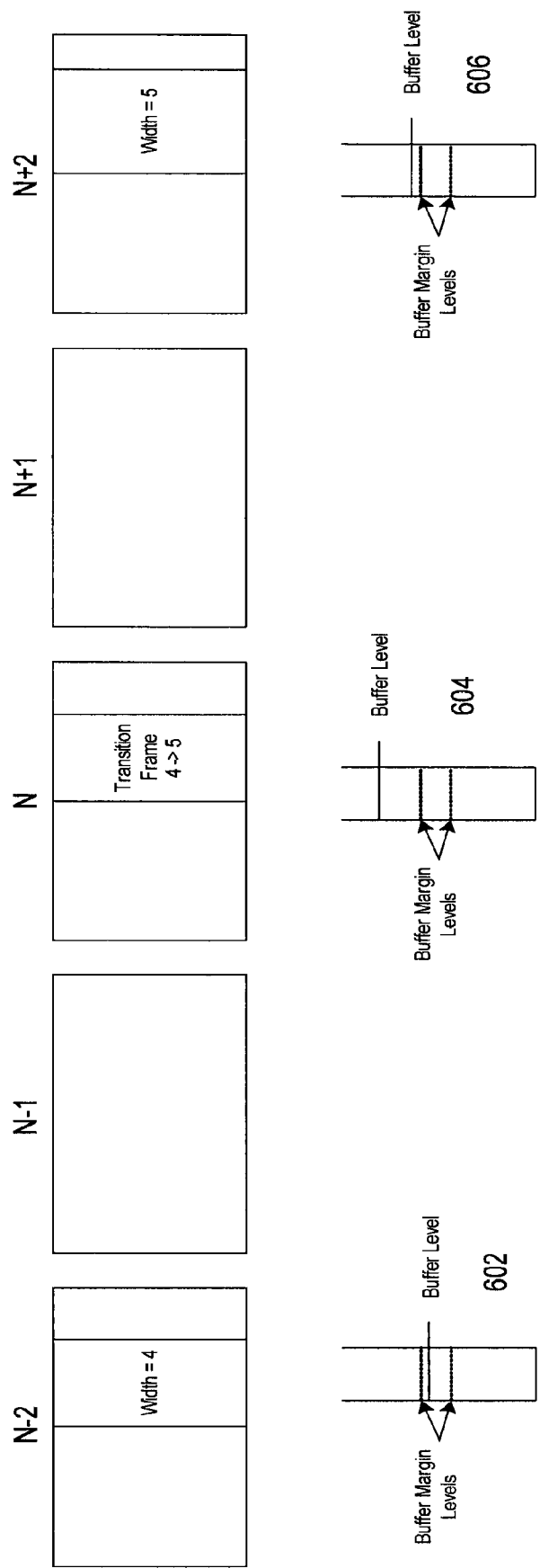
FIG. 6 illustrates of a macro-diversity region width change procedure in accordance with an embodiment.

FIG. 6 illustrates one embodiment of a macro-diversity region width change procedure in accordance with an embodiment. The macro-diversity region control module 150, based on a level of buffer 312 (referred to herein as a backlog buffer level) and configuration settings, may determine whether to increase or decrease the width of the macro-diversity region. The Configuration File 304 specifies a set of maximum and minimum buffer backlog levels and depending on whether the backlog is outside these margin levels, the macro-diversity region control module 150 decides whether to increase or decrease the width of the macro-diversity region. The buffer levels 602, 604, and 606 of the buffer 312 represent buffer levels associated with frames N−2, N and N+2 respectively. Assume that the macro-diversity frames have frame relevance (K) of at least two frames and at most five frames. As used herein, the term "frame relevance" specifies the number of elements in a default width size vector. For example, assuming a frame relevance of three, K=3, the default width size vector may be specified as follows, {w1, w2, w3} such that the default width size vector specifies a repeating pattern of length 3, and where w1, w2, and w3 specify the default width of a particular macro-diversity region in the pattern. For example, with such a default width vector, the first macro-diversity region will have a width=w1, the second a width=w2, the third a width=w3, the fourth a width=w1, the fifth a width=w2, and so on. Further, in such an example, the macro-diversity region control module 150 may monitor the buffer level once every $K^{th}$ frame. Assuming a frame relevance, K, of two and that in Frame N the macro-diversity region control module 150 decides to change the width of the macro-diversity region from 4 to 5. The transition from one frame size to another may be performed using a transition frame identified in frame N. A transition frame structure may be contained in the lookup table in the Profile File 302. The macro-diversity region control module 150 finds the appropriate transition frame structure (in this case 4→5) and places that in frame N such that Frame N+2 will have the required width of 5.

Figure 7:
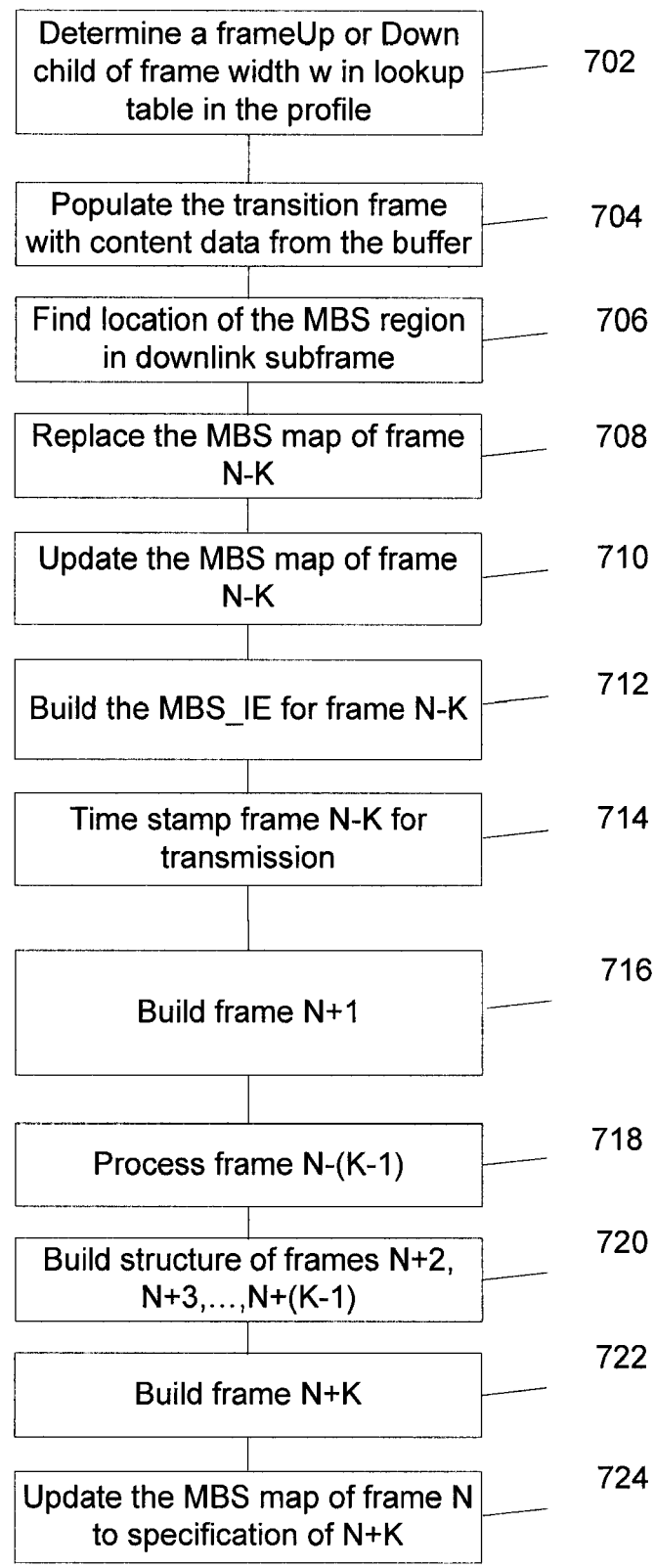
FIG. 7 is a diagram illustrating a macro-diversity region size adjustment process in accordance with an embodiment.
Figure 8:
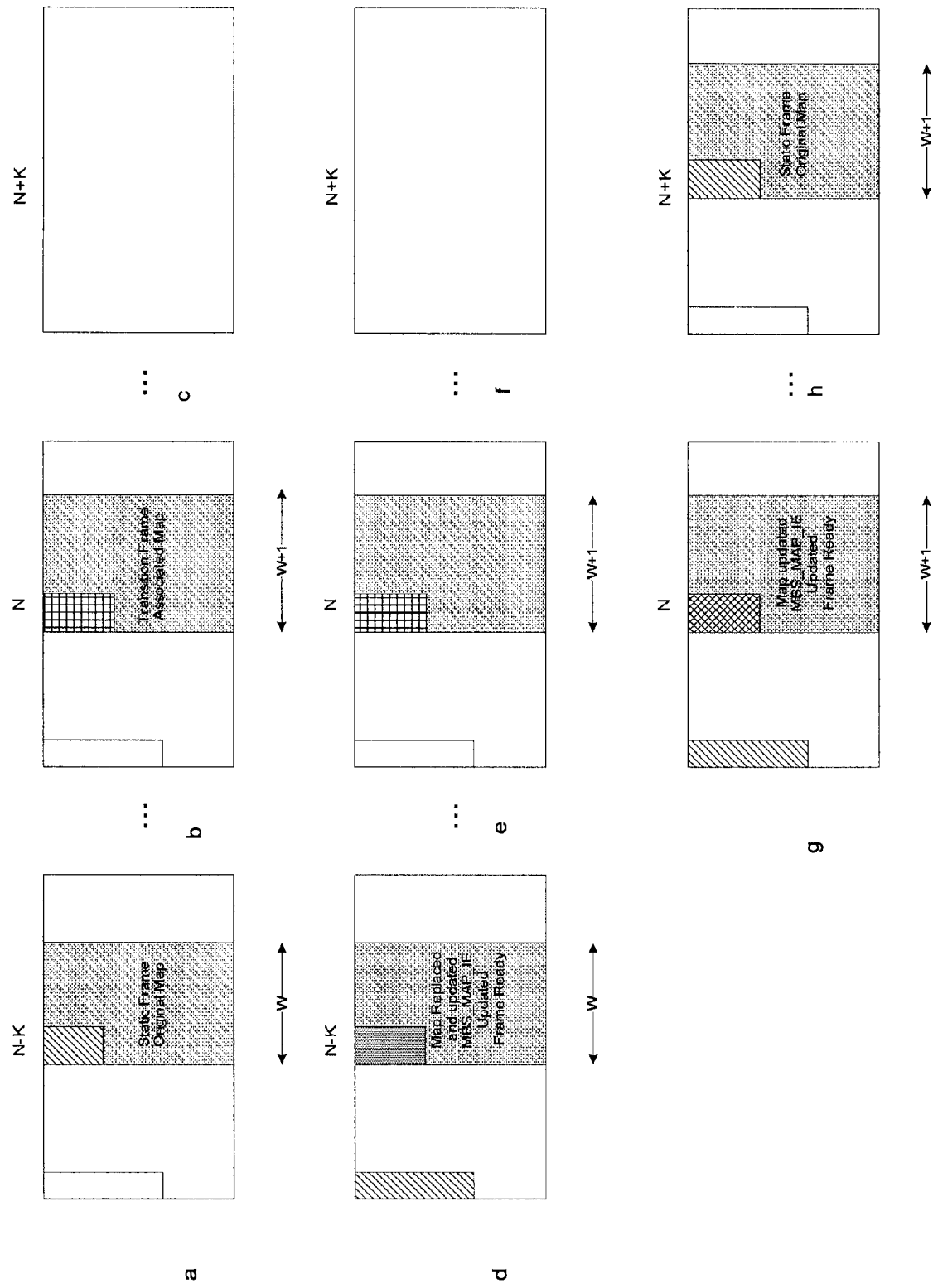
FIG. 8 illustrates a pictorial view of the process illustrated in FIG. 5 in accordance with an embodiment.

FIG. 7 is a diagram illustrating a macro-diversity region size adjustment process in accordance with an embodiment. For explanatory purposes, FIG. 7 will be discussed in conjunction with FIG. 8, where FIG. 8 is a pictorial representation of frames illustrating the process of FIG. 7.

The width or size of a macro-diversity region or macro-diversity region for a set of incoming data rates may be specified in the configuration settings of the macro-diversity region control module 150. The configuration settings may be included in a Configuration File 304 associated with the macro-diversity region control module 150 as was described above. In one embodiment default values for the width of the macro-diversity region may be identified by the macro-diversity region control module 150 to match a stated or current incoming data rate. For each configuration setting, the width of the macro-diversity region frame in each frame, for example an OFDMA frame, may be chosen such that the average output data rate best matches the incoming data rate. A default width set may be associated with each incoming data rate in the Configuration File 304. Each configuration setting may specify a frame relevance, where the frame relevance specifies the number of elements in a default width size vector. The frame relevance may be denoted by K, and the default width size vector by $(w_0, w_1, \ldots, W_{K-1})$. Thus the macro-diversity region control module 150 may monitor the buffer level once every $K^{th}$ frame. The default width for each frame with index i may be given by $w_{i\,mod\,K}$. Therefore frame indices 0, K, 2K, . . . may have a default width $w_0$, frame indices 1, K+1, 2K+1, . . . may have a default width $w_1$ and frame indices K−1, 2K−1, 3K−1, . . . may have a default width $w_{K-1}$.

Consider the example with a configuration setting with frame relevance K in effect. A buffer backlog measurement, such as described above in the exemplary embodiments of FIG. 4 and 5, in frame N may result in a decision to increase or decrease the width of the macro-diversity region from the current width w. The width of the macro-diversity region may be increased by one symbol group to w+1 or w−1. In one embodiment assume that the width of the macro-diversity region in frames N−1, N−2 . . . N−(K−1) does not change. The following exemplary procedure for adjusting the size of the macro-diversity region may be implemented in the macro-diversity region control module 150 after a determination is made to adjust the size of the macro-diversity region.

At step 702 the macro-diversity region control module 150 starts with the procedure by identifying a transition frame structure, for example, frameUp or frameDown, depending on whether increasing or decreasing the width w of the macro-diversity region. The transition frame structure of the frame width w may be obtained from the lookup table in the Profile File 302 and may represent the structure of the transition frame that may be placed in frame N. In step 704 the macro-diversity region control module 150 populates the transition frame with the content data from the buffer 312. In one embodiment the macro-diversity region control module 150 adds headers to the transition frame and computes a cyclic redundancy check-16 (CRC-16) that is added to, the data packets, which may be for example, the hybrid automated repeat request (HARQ) packets. Or, for example, cyclic redundancy check-32 (CRC-32) may be computed and added if specified by the profile. CRC is a common technique for detecting data transmission errors.

The process then continues to step 706 where the location of the macro-diversity region in the downlink subframe is identified. In particular, the symbol offset of the starting location of the macro-diversity region in frame N is determined. Steps 702, 704 and 706 are illustrated by frames "a", "b" and "c" of FIG. 8.

In step 708, the macro-diversity map of frame N–K is replaced with the replacement map specified in the transition frame defined in, for example, the Profile File 302. And, in step 710 the macro-diversity map of frame N–K is updated accordingly to point to the correct location of the macro-diversity map in frame N. The process then continues to step 712 where the macro-diversity information element (MBS-IE) for frame N–K is built and updated with appropriate values. The MBS_IE may be an element inside the DL-MAP (downlink MAP) which describes the location of the macro-diversity region inside a downlink sub-frame. The MBS-IE may be built by the macro-diversity region control module 150 and forwarded to the ASN-GW 120 along with the description of each frame. MBS_IE may have a number of fixed elements and some of its elements may be modified by the macro-diversity region control module 150. The fixed elements of the MBS_IE may be specified in the profile and configuration settings.

Steps 708, 710 and 712 are illustrated by "d", "e" and "f" of FIG. 8. The MAP of frame N–K is replaced to point to the correct location of the macro-diversity map in frame N that is associated with frame relevance K. Also the MBS_IE is updated to reflect the change in the size, for example, of the macro-diversity region in frame N. The frame may then be time stamped in step 714 and sent to MRDP-MBSC for delivery to the ASN-GW. The time stamping information added to frame structure may be used by the base stations to enable the individual base stations 130 to time synchronize the transmission of the content data to the client stations 132, so that each base station 130 simultaneously transmits the content data. The process then continues to step 716 where frame N+1 is built (if it exists) and populated with content data, for example. Similar to the process implemented with frame N–K with respect to frame N, frame N–(K–1) may be processed appropriately in step 718. Assuming that frame N–(K–1) is not a transition frame, its structure does not have to change. After updating its macro-diversity map and MBS_IE and time-stamping, the frame may be delivered to MRDP-MBSC. Similarly in step 720 the structures of frames N+2, N+3 . . . N+(K–1) are built and the appropriate macro-diversity map and MBS_IE of their corresponding representative frames are updated.

The process then continues to step 722 where frame N+K is built using the the appropriate new width (w+1 or w–1) determined by the buffer balancing algorithm and the frame N+K is populated. Finally in step 724, the macro-diversity map including the MBS_IE of frame N is updated to accurately specify frame N+K. Further frame N+K is time-stamped and delivered to the MRDP-MBSC for delivery to the ASN-GW, for example. The process of step 722 and 724 is illustrated in "g" and "h" of FIG. 8.

Figure 9:
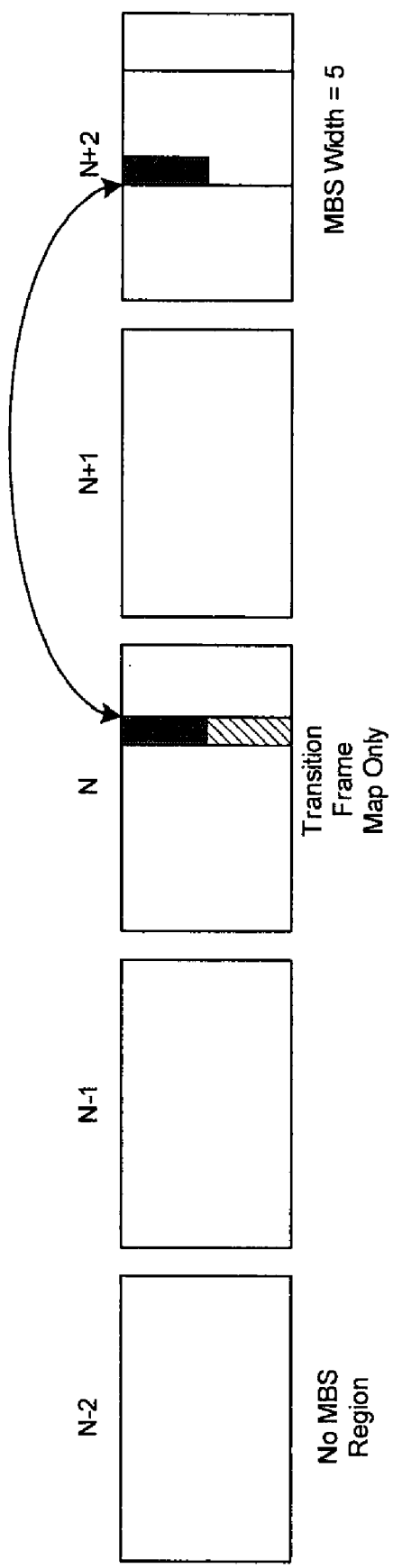
FIG. 9 illustrates an example of a frame width transition of macro-diversity region frames with multiple symbol group difference in width in accordance with an embodiment.

FIG. 9 illustrates an example of a frame width transition from one macro-diversity region frame to another with a multiple symbol group difference in width in accordance with an embodiment. In one embodiment the width transition for buffer backlog control may be between macro-diversity frames with one symbol group difference in the width. Transition frame structures for transition frames may be provided in the lookup table in the macro-diversity region control module 150. However, there are situations that require a width change of more than one, such as, for example during startup procedure, or during scheduled rate changes. Or, for example, if the width of the macro-diversity region in the previous frame has reached maximum and it is determined to increase the width of the macro-diversity region, the macro-diversity region control module 150 may open a new macro-diversity region in a frame that currently does not include a macro-diversity region. For example, in the present example, frames N–2 and N–1 do not include a macro-diversity region, so if it is determined to increase the outgoing rate of content packets and all the presently used macro-diversity regions are at their maximum, the macro-diversity region control module 150 may add a macro-diversity region to either frame N–2 or N–1. In doing so, the macro-diversity region control module 150 may use a transition frame (e.g., N–1) between the last frame without a macro-diversity region (e.g., N–1–K, where K is the frame relevance), and the frame with the newly established macro-diversity region (e.g., N–1+K). Since there is no macro-diversity region available in the transition frame (e.g., N–1), the macro-diversity region of the transition frame may include only the map of the static frame with the target width and does not include any data protocol/packet data units (PDUs). PDU's may include information that is delivered as a unit among peer entities of a network and may contain control information, address information, or data. In this embodiment the frame is started with width of five symbol groups in a configuration setting with frame relevance of two frames as illustrated by frames N and N+2. As illustrated in FIG. 9, the width of the macro-diversity region in frame N+2 increased from 0 in frame N to 5 in frame N+2.

Figure 10:
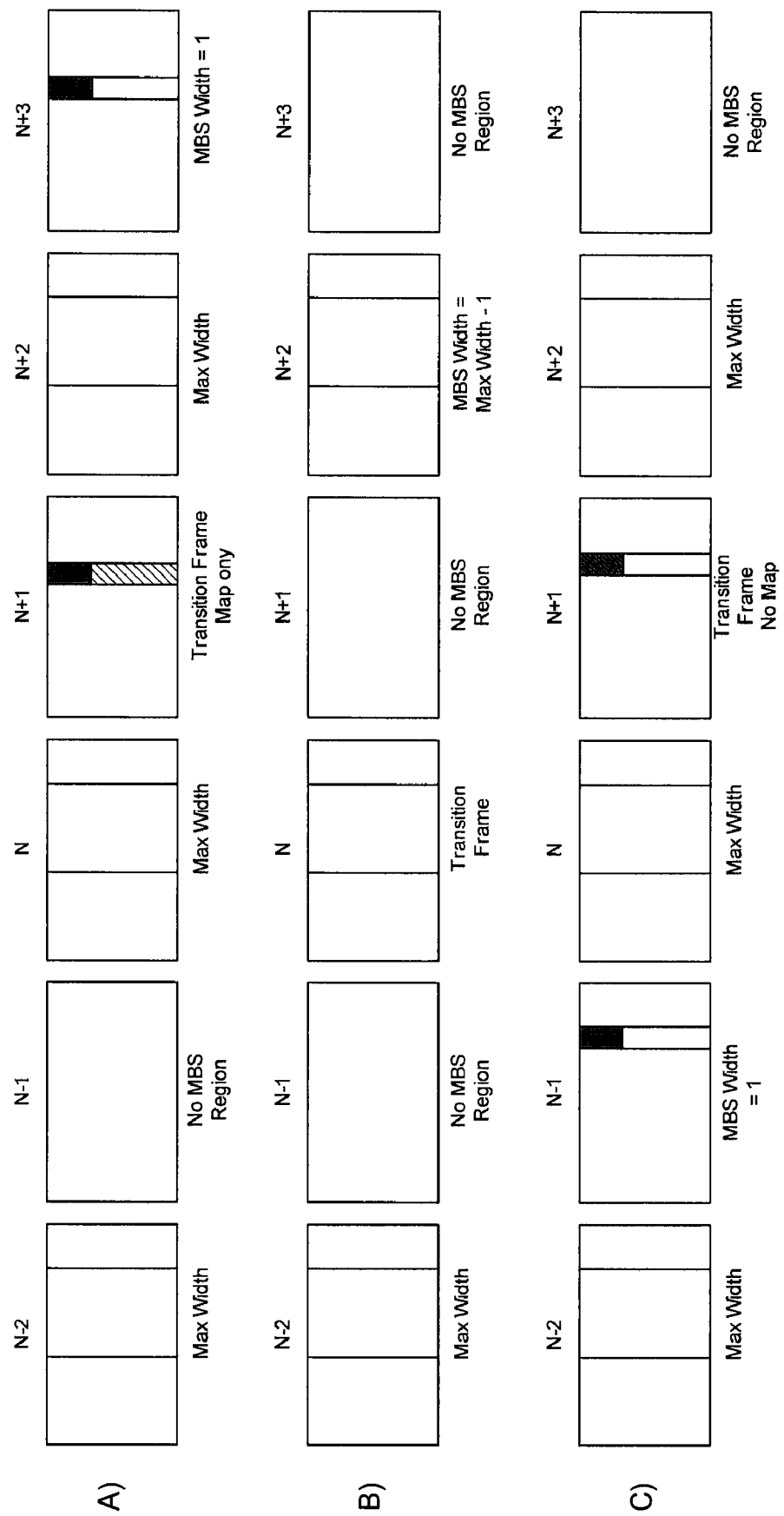
FIG. 10 illustrates different scenarios of width transition in accordance with an embodiment.

FIG. 10 illustrates different scenarios of width transition in accordance with an embodiment. Each width transition may be performed with consideration of the maximum allowed width of the macro-diversity region. The lookup table in the macro-diversity region control module 150 may categorize all possible width transitions. Some of these transitions may be beyond the maximum width limit as set in the active configuration setting. For example, the system may specify that the maximum macro-diversity region width is 20, but active configuration setting specify a maximum width of 10. In such an example, the lookup table may specify not only the possible transition frames for widths 1-20 even though only widths 1-10 are currently being used by the system. The scenarios illustrated by each of the groups of frames identified as A, B and C of FIG. 10 describes different scenarios of width transition.

Assume a frame relevance of two and that each case is categorized with Width_e as the width of even-numbered frames, Width_o as the width of odd-numbered frames, and Max as the maximum allowed width in symbol groups. In scenario A, Width_e =Max (for example at frame N–2, N, N+2 etc.), Width_o=0 (for example at frame N–1). If there is a rate increase, a transition frame Width_o=1 (transition frame width at frame N+1) may be used to increase the width of a frame to accommodate the rate increase. Width_e remains fixed at the maximum value and Width_o may transition to one by the procedure illustrated in FIGS. 6, 7 and 8 above. In scenario B, Width_e=Max and Width_o=0. If there is a rate decrease, a transition frame to Width_e=Max−1 may be used (illustrated by frame N and N+2) to decrease the width of a frame to accommodate the rate decrease. Width o remains fixed at zero as illustrated by frames N−1, N+1 etc. In scenario C, Width_e=Max and Width_o=1 and there is a rate decrease. In this case a transition frame to Width_o=0 may be used. Width_e remains fixed at maximum value. However if Width_e=Max, Width_o=Max, and there is a rate increase a Bandwidth Insufficient alarm, for example, may be generated to warn of a possible backlog data overload.

Figure 11:
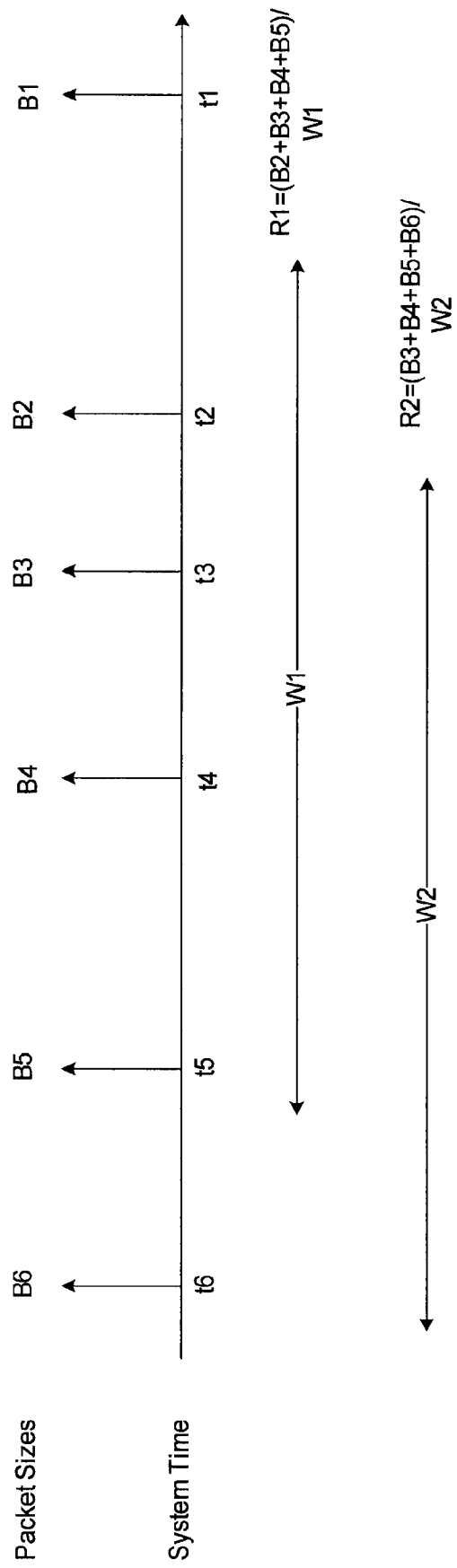
FIG. 11 illustrates one example of steady state rate monitoring in accordance with an embodiment.

FIG. 11 illustrates one example of steady state rate monitoring according to an embodiment. The steady state rate monitoring may be implemented in the macro-diversity region control module 150 illustrated in FIG. 1. The macro-diversity region control module 150 may be configured to monitor the incoming data rate from the IP encapsulator 116, for example, illustrated in FIG. 1 above. The number of bytes deposited in the buffer 312 from the IP encapsulator 116 may be measured and averaged over a window of W to estimate the arrival rate of the content data. The average arrival rate may be estimated using the formula $$R = \frac{\sum_i B_i}{W},$$

where $B_i$ is the size of the $i^{th}$ packet of content data in terms of bits per second and summation is over the set of packets of content data that arrive during window W at the measurement time in terms of seconds.

Figure 12:
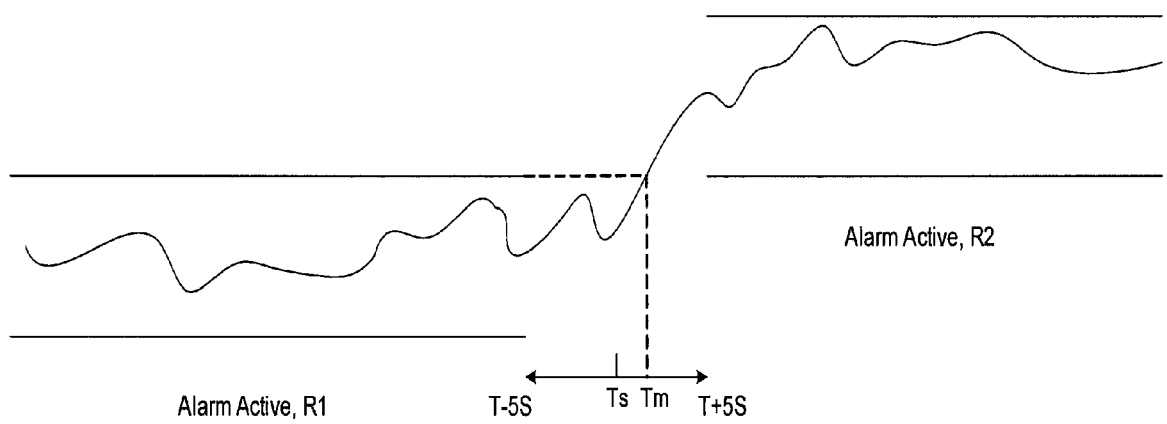
FIG. 12 illustrates one example of rate monitoring during a scheduled rate change in accordance with an embodiment.

Thus, the average arrival rate R1 over a window period W1 is given by R1=(B2+B3+B4+B5)/W1 where B2 to B5 are the sizes of the second through fifth packets of content data arriving at system time t2 to t5 respectively. Likewise the average arrival rate R2 over a window period W2 is given by R2=(B3+B4+B5+B6)/W2 where B3 to B6 are the sizes of the third through sixth packets arriving at system time t3 to t6 respectively. In one embodiment the size of measurement window W may be large enough to provide an accuracy of the measured data rate of better than ±10 kbps. In some embodiments, if at any point the measured data rate is more than 20 kpbs away from the stated data rate, a rate mismatch alarm may be generated. The arrival rate may be consistently measured and the measured rate may be allowed to change within a tolerance of, for example 10 kbps, of the nominal scheduled rate without triggering an alarm. This alarm may then be provided to, for example, ASP 160 of FIG. 1 to alert ASP 160 that it is providing an incoming data rate different than the specified incoming data rate. ASP 160 may then, for example, adjust its data rate accordingly. Or for, example, an administrator may change the configuration and/or schedule files in accordance with new incoming data rate from ASP 160, if appropriate FIG. 12 illustrates one example of rate monitoring during a scheduled rate change in accordance with an embodiment. The steady state rate monitoring described below may be implemented in the macro-diversity region control module 150 illustrated in FIG. 1. If a configuration change is scheduled and the change involves a change in the expected incoming data rate, the trigger for starting the rate change procedure may be generated after sensing the change in the incoming data rate. For example, assume that a scheduled data rate change time is at time T and the incoming data rate is scheduled to change from an initial rate, $R_1$, to a new rate, $R_2$. A rate monitoring alarm may be disabled within a window of time $T_s$, for example 10 seconds, around time T, i.e., the alarm is disabled within the interval of $T_s$ illustrated by (T−5sec, T+5sec), for example. A rate change is detected when the measured rate first hits one of the rate limits around $R_1$, for example, $R_1$−20 kbps or $R_1$+20kbps. The time of this event, $T_m$, for example, may act as the trigger for the rate change procedure and a [Rate Change] indicator may be generated. At the conclusion of this time window $T_s$, if a rate change was not detected, a [Scheduled Rate Change Window Expired] alarm, for example, may be generated and the new stated rate becomes effective. This alarm may be provided to, for example, an administrator or ASP 160 to provide notification of the difference between the expected and actual incoming data rates so that appropriate corrective action may be taken, such as, for example, as noted above. The incoming data stream may be deposited into the buffer 312, where the macro-diversity region control module-core 308 may keep the backlog level of the buffer 312 within a range or target level. The macro-diversity region control module 150 performs this by serving the buffer 312 with macro-diversity frames of different width. The macro-diversity region control module 150 may control the outgoing data rate by changing the width of the macro-diversity region. This process of balancing the incoming data rate with the outgoing data rate may be decided by a buffer balancing algorithm and may be referred as rate matching and may use a procedure such as discussed above with reference to FIGS. 4 and 5. In some embodiments the backlog target levels (also referred to herein as target backlog buffer levels) may be adjusted during a scheduled rate change. For example, assume rate $R_1$ is the stated operating rate in bits per seconds before the rate transition and rate $R_2$ is the stated rate after the rate transition. The backlog target level (in bytes) before the transition may be set to $B_1 = R_1 T / 8000$ where T is the backlog target delay in milliseconds that may be set in the profile. Because in this example, T is in terms of milliseconds and R is in terms of bits per second, a normalizing factor of 8000 is used so that B is in terms of bytes. The backlog target level may linearly increase from $R_1 T/8000$ to $R_2 T/8000$ in a period of T after detecting that the new rate has become effective. Backlog margin levels may be updated along with the backlog target level. Upon detecting the new arrival rate, the macro-diversity region control module 150 may start a timer that expires after a period of T. The new outgoing rate may become effective after the expiry of this timer.

Figure 13:
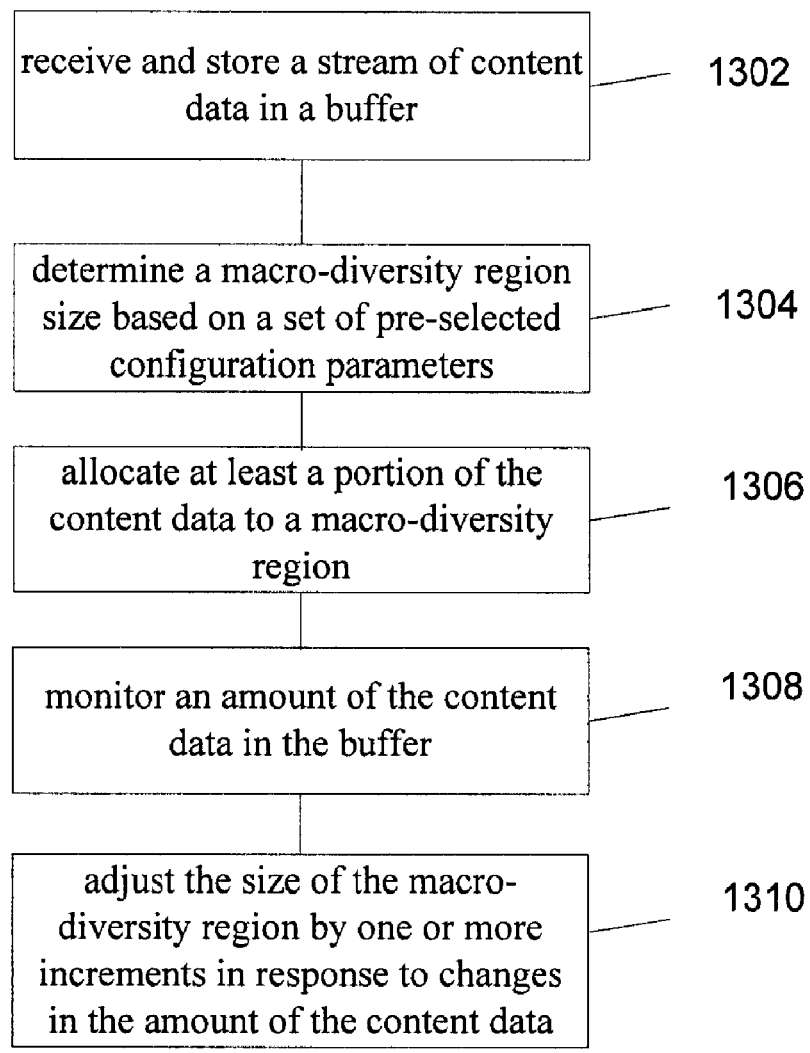
FIG. 13 illustrates one example of a method of adjusting the size of a macro-diversity region in accordance with an embodiment.

FIG. 13 illustrates one example of a method of adjusting the size of a macro-diversity region according to an embodiment utilizing the methods and processes described above. The steps of this method may be implemented in the macro-diversity region control module 150 illustrated in FIG. 1. At step 1302 the procedure starts with receiving and storing content data into the buffer 312. Content providers or content sources may provide the content data. The content data distributed by the content providers may be various forms of audio, video, multimedia and other forms of content including audio/video streams, motion picture expert group-2 (MPEG-2), MPEG-4, windows media video (WMV) etc. The process then continues to step 1304 where the macro-diversity region size is determined based on a set of pre-selected configuration parameters including an incoming rate of the stream of content data. In step 1306 at least a portion of the content data is allocated to a macro-diversity region. The process continues to step 1308 where the amount of the content data in the buffer 312 is monitored in accordance with the set of pre-selected configuration parameters to determine whether the amount of content data falls into or out of a target range defined by a low-end value and a high-end value.

In step 1310 the size of the macro-diversity region is adjusted by one or more increments, for example symbols, in response to changes in the amount of the content data in accordance with the target range as was described above in reference to FIG. 6. The size of the macro-diversity region may be maintained in response to a determination that the amount of content data in the buffer 312 falls within the target range. Further a notification procedure may be invoked in response to a determination that the amount of content data in the buffer 312 is above the high-end value or is below the low-end value. The size of the macro-diversity region may be increased in response to a determination that the amount of content data in the buffer 312 is above a high-end value or decreased in response to a determination that the amount of content data in the buffer 312 is below a low-end value. In some embodiments the method includes transitioning from one macro-diversity region size to another via a transition frame as illustrated in FIGS. 6, 7, and 9 above. The macro-diversity region of a prior frame may be replaced in accordance with a replacement map specified in the transition frame. In other embodiments the method further includes incrementing or decrementing the size of a virtual buffer module in response to changes in the scheduled incoming rate and output rate of the content data. The virtual buffer module may be configured to accommodate response to large bursts of content data received by the buffer 312.

Figure 14:
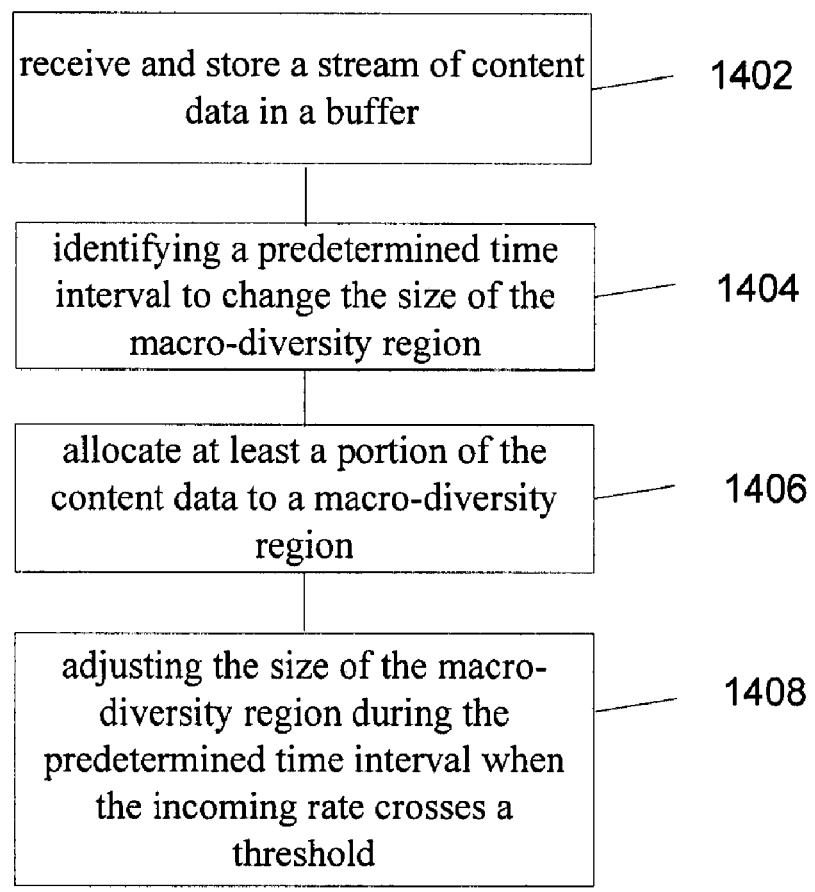
FIG. 14 illustrates another example of a method of adjusting the size of a macro-diversity region in accordance with an embodiment.

FIG. 14 illustrates another example of a method of adjusting the size of a macro-diversity region according to an embodiment utilizing the methods and processes described above. The steps of this method may be implemented in the macro-diversity region control module 150 illustrated in FIG. 1. At step 1402 the procedure starts with receiving and storing a stream of content data into a buffer 312. In step 1404 the macro-diversity region control module 150 identifies a predetermined time interval during which to change the size of the macro-diversity region, such as was discussed above with reference to FIG. 12. The process then continues to step 1406 where at least a portion of the content data is allocated to a macro-diversity region. In step 1408, the size of the macro-diversity region is adjusted during the predetermined time interval when the incoming rate of the content data crosses a threshold such as was described above.

In one embodiment the predetermined time interval is selected by, for example, an engineer or administrator, based on a historic traffic pattern. The macro-diversity region may be increased to accommodate an increase in the average amount of content data that is above a high end threshold or decreased to accommodate a decrease in the average amount of content data that is below a low end threshold. In one embodiment the process further includes determining the macro-diversity region size based on a set of pre-selected configuration parameters including an incoming rate of the stream of content data. Further the process may include monitoring an amount of the content data in the buffer 312 in accordance with one of the configuration parameters of the set of pre-selected configuration parameters to determine whether the amount of content data falls into or out of a target range defined by a low-end value and a high-end value. The size of the macro-diversity region may then be adjusted by one or more increments, for example symbols, in response to changes in the amount of the content data in accordance with the target range. In some embodiments the method includes transitioning from one macro-diversity region size to another via a transition frame. The macro-diversity region of a prior frame may be replaced in accordance with a replacement map specified in the transition frame In other embodiments the method further includes incrementing or decrementing the size of a virtual buffer module in response to changes in the scheduled incoming rate and output rate of the content data. The virtual buffer module may be configured to accommodate large bursts of content data deposits.

Various implementations of the present disclosure can be realized in electronic hardware, computer software, or combinations of these technologies. Some implementations include one or more computer programs executed by one or more computing devices. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., interfaces, mice, and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein may often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium including a network storage medium. An exemplary storage medium may be coupled to the processor such that the processor may read information from, and write information to, the storage medium. In the alternative, the storage medium may be integral to the processor. The processor and the storage medium may also reside in an ASIC.

The above description of the disclosed implementations is provided to enable any person skilled in the art to make or use the invention. Various modifications to these implementations will be readily apparent to those skilled in the art, and the generic principles described herein may be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method of adjusting a size of a macro-diversity region to be synchronously transmitted in downlink frames from a plurality of base stations in a network, the method comprising:
   receiving and storing content data into a buffer;
   determining the macro-diversity region size based on a set of pre-selected configuration parameters including an incoming rate of the content data;
   allocating at least a portion of the content data in the buffer to the macro-diversity region;
   monitoring an amount of the content data in the buffer in accordance with the set of pre-selected configuration parameters including an incoming rate of the content data to determine whether the amount of content data in the buffer is within a target range defined by a low-end value and a high-end value;
   adjusting the size of the macro-diversity region by one or more increments in response to changes in the amount of the content data in accordance with the target range; and
   transmitting the macro-diversity region to the plurality of base stations for synchronous transmission to a client station.

2. The method of claim 1, further comprising maintaining the size of the macro-diversity region in response to a determination that the amount of content data in the buffer falls within the target range.

3. The method of claim 1, further comprising increasing the size of the macro-diversity region in response to a determination that the amount of content data in the buffer is above the high-end value.

4. The method of claim 1, further comprising decreasing the size of the macro-diversity region in response to a determination that the amount of content data in the buffer is below the low-end value.

5. The method of claim 1, further comprising:
   increasing the value of a counter at a rate that matches the scheduled average input rate and decreasing the value of the counter in response to transferring the content data to a macro-diversity region;
   increasing the macro-diversity region size in response to a determination that the counter value is above a threshold value; and
   decreasing the macro-diversity region size in response to a determination that the counter value is below a threshold value.

6. The method of claim 1, further comprising:
   identifying a transition frame structure in response to a determination to increase or decrease the size of the macro-diversity region;
   generating a transition frame with a size based on the transition frame structure; and
   populating the transition frame with the content data from the buffer.

7. The method of claim 6, further comprising updating a macro-diversity region map of a prior frame with a replacement map specified in the transition frame structure.

8. A method of adjusting a size of a macro-diversity region to be synchronously transmitted in downlink frames from a plurality of base stations, the method comprising:
   receiving and storing a stream of content data into a buffer;
   identifying a predetermined time interval to change the size of the macro-diversity region;
   allocating at least a portion of the content data to the macro-diversity region; and
   adjusting the size of the macro-diversity region during the predetermined time interval when the incoming rate crosses a threshold; and
   transmitting the macro-diversity region to the plurality of base stations for synchronous transmission to a client station.

9. The method of claim 8, wherein the time interval is selected based on a historical traffic pattern.

10. The method of claim 8, wherein the macro-diversity region is increased to accommodate an increase in the average amount of content data that is above the threshold.

11. The method of claim 8, wherein the macro-diversity region is decreased to accommodate a decrease in the average amount of content data that is below the threshold.

12. The method of claim 8, further comprising:
   determining the macro-diversity region size based on a set of pre-selected configuration parameters including an incoming rate of the stream of content data;
   monitoring an amount of the content data in the buffer in accordance with the set of pre-selected configuration parameters including an incoming rate of the content data to determine whether the amount of content data in the buffer is within a target range defined by a low-end value and a high-end value; and
   adjusting the size of the macro-diversity region by one or more increments in response to changes in the amount of the content data in accordance with the target range.

13. The method of claim 8, further comprising:
   identifying a transition frame structure in response to a determination to increase or decrease the size of the macro-diversity region;
   generating a transition frame with a size based on the transition frame structure; and
   populating the transition frame with the content data from the buffer.

14. The method of claim 13, further comprising updating a macro-diversity region map of a prior frame with a replacement map specified in the transition frame structure.

15. The method of claim 8, further comprising:
   increasing the value of a counter in response to an increase in the level of content data in the buffer or decreasing the value of the counter in response to transferring the content data to a macro-diversity region;
   increasing the macro-diversity region size in response to a determination that the counter value is above a threshold value; and
   decreasing the macro-diversity region size in response to a determination that the counter value is below a threshold value.

16. An apparatus configured to adjust the size of a macro-diversity region to be synchronously transmitted from a plurality of base stations, the apparatus comprising:
   a buffer configured to receive and store a stream of content data; and
   a controller module connected to the buffer, the controller module configured to:
   determine the macro-diversity region size based on a set of pre-selected configuration parameters including an incoming rate of the content data,
   allocate at least a portion of the content data to the macro-diversity region,
   monitor an amount of the content data in the buffer in accordance with the set of pre-selected configuration parameters including an incoming rate of the content data to determine whether the amount of content data in the buffer is within a target range defined by a low-end value and a high-end value,
   adjust the size of the macro-diversity region by one or more increments in response to changes in the amount of the content data in accordance with the target range, and
   transmit the macro-diversity region to the plurality of base stations for synchronous transmission to a client station.

17. The apparatus of claim 16, further comprising a communication module connected to the controller module and configured to establish a communication link with the plurality of base stations.

18. The apparatus of claim 17, wherein the communication link is configured to transmit the macro-diversity region to the plurality of base stations.

19. The apparatus of claim 16, further comprising a virtual buffer module having a counter that is configured to increase in value in response to an increase in the level of content data in the buffer or decrease in the value in response to transferring the content data to a macro-diversity region, wherein the macro-diversity region size is increased in response to a determination that the counter value is above a threshold value or decreased in response to a determination that the counter value is below a threshold value.

20. The apparatus of claim 16, wherein the controller module is further configured to:
   identify a transition frame structure in response to a determination to increase or decrease the size of the macro-diversity region;
   generate a transition frame with a desired size based on the transition frame structure; and
   populate the transition frame with the content data from the buffer.

21. The apparatus of claim 20, wherein the controller module is further configured to update a macro-diversity region map of a prior frame with a replacement map specified in the transition frame structure.

22. An apparatus configured to adjust a size of a macro-diversity region region to be synchronously transmitted in downlink frames from a plurality of base stations, the apparatus comprising:
   a buffer to receive and store a stream of content data; and
   a controller module connected to the buffer, the controller module configured to;
   allocate at least a portion of the content data to the macro-diversity region,
   identify a predetermined time interval to change the size of the macro-diversity region,
   adjust the size of the macro-diversity region during the predetermined time interval when the rate crosses a threshold, and
   transmit the macro-diversity region to the plurality of base stations for synchronous transmission to a client station.

23. The apparatus of claim 22, wherein the controller module is further configured to:
   determine the macro-diversity region size based on a set of pre-selected configuration parameters including an incoming rate of the stream of content data;
   monitor an amount of the content data in the buffer in accordance with the set of pre-selected configuration parameters including an incoming rate of the content data to determine whether the amount of content data in the buffer is within a target range defined by a low-end value and a high-end value; and
   adjust the size of the macro-diversity region by one or more increments in response to changes in the amount of the content data in accordance with the target range.

24. The apparatus of claim 22, further comprising a communication module connected to the controller module and configured to establish a communication link with the plurality of base stations.

25. The apparatus of claim 22, further comprising a virtual buffer module having a counter that is configured to increase in value in response to an increase in the level of content data in the buffer or decrease in the value in response to transferring the content data to a macro-diversity region, wherein the macro-diversity region size is increased in response to a determination that the counter value is above a threshold value or decreased in response to a determination that the counter value is below a threshold value.

26. The apparatus of claim 22, wherein the controller module is further configured to:
   identify a transition frame structure in response to a determination to increase or decrease the size of the macro-diversity region;
   generate a transition frame with a desired size based on the transition frame structure; and
   populate the transition frame with the content data from the buffer.

27. The apparatus of claim 26, wherein the controller module is further configured to update a macro-diversity region map of a prior frame with a replacement map specified in the transition frame structure.

28. A system configured to adjust a size of a macro-diversity region to be transmitted from a plurality of base stations, the system comprising:
   a buffer configured to receive and store a stream of content data;

a controller in communication with the buffer, the controller configured to:
- determine the macro-diversity region size based on a set of pre-selected configuration parameters including an incoming rate of the content data,
- allocate at least a portion of the content data to the macro-diversity region,
- monitor an amount of the content data in the buffer in accordance with the set of pre-selected configuration parameters including an incoming rate of the content data to determine whether the amount of content data in the buffer is within a target range defined by a low-end value and a high-end value,
- adjust the size of the macro-diversity region by one or more increments in response to changes in the amount of the content data in accordance with the target range, and
- transmit the macro-diversity region to the plurality of base stations; and the plurality of base stations configured to synchronously transmit the macro-diversity region to a client station.

* * * * *